US012629858B2

(12) United States Patent
Elliston et al.

(10) Patent No.: US 12,629,858 B2
(45) Date of Patent: *May 19, 2026

(54) CIRCULAR SAW BLADE

(71) Applicant: BLACK & DECKER INC., New Britain, CT (US)

(72) Inventors: Asif Elliston, East Longmeadow, MA (US); Kenneth E. Hall, East Longmeadow, MA (US); Graham E. Lincoln, Cornelius, NC (US)

(73) Assignee: BLACK & DECKER INC.

( * ) Notice: Subject to any disclaimer, the term of this patent is extended or adjusted under 35 U.S.C. 154(b) by 542 days.

This patent is subject to a terminal disclaimer.

(21) Appl. No.: 17/985,666

(22) Filed: Nov. 11, 2022

(65) Prior Publication Data

US 2023/0084067 A1 Mar. 16, 2023

Related U.S. Application Data

(63) Continuation of application No. 16/825,020, filed on Mar. 20, 2020, now Pat. No. 11,524,348.

(60) Provisional application No. 62/829,106, filed on Apr. 4, 2019.

(51) Int. Cl.
B23D 61/02 (2006.01)
B23D 61/04 (2006.01)

(52) U.S. Cl.
CPC ........... B23D 61/021 (2013.01); B23D 61/04 (2013.01)

(58) Field of Classification Search
CPC .............................. B23D 61/04; B23D 61/021
See application file for complete search history.

(56) References Cited

U.S. PATENT DOCUMENTS

| | | | |
|---|---|---|---|
| 4,179,967 A | 12/1979 | Clark | |
| RE31,433 E | 11/1983 | Clark | |
| 4,727,935 A | 3/1988 | Lapeyre | |
| 4,813,324 A | 3/1989 | Yoshida et al. | |
| 4,827,822 A | 5/1989 | Yoshida et al. | |
| 4,958,546 A | 9/1990 | Yoshida et al. | |
| 5,410,935 A | 5/1995 | Holston et al. | |
| 5,697,280 A | 12/1997 | Armstrong et al. | |
| 6,439,094 B1 * | 8/2002 | Yoneda ................ | B23D 61/121 83/846 |

(Continued)

FOREIGN PATENT DOCUMENTS

| | | |
|---|---|---|
| JP | 2000127104 A | 5/2000 |
| JP | 2004066400 A  * | 3/2004 |

(Continued)

OTHER PUBLICATIONS

Extended European Search Report, EP Application No. 23186070.1, Sep. 20, 2023, 9 pages, EPO.

*Primary Examiner* — Liang Dong
(74) *Attorney, Agent, or Firm* — Dickinson Wright PLLC

(57) ABSTRACT

A circular saw blade includes a plurality of cutting teeth repeatedly alternating between a first set of cutting teeth and a second set of cutting teeth around the periphery of the saw blade. Each first set of cutting teeth includes at least two efficient cutting teeth, each second set of cutting teeth comprising at least ne robust cutting tooth. Each first set of teeth and each second set of teeth are configured such that, if one tooth in the first set of teeth breaks, the chip load in the immediately following second set of teeth increases by less than approximately 45%.

20 Claims, 26 Drawing Sheets

(56)     References Cited

U.S. PATENT DOCUMENTS

| | | | |
|---|---|---|---|
| 6,532,852 B1 | 3/2003 | Tsujimoto et al. | |
| 8,210,081 B2 | 7/2012 | Elliston et al. | |
| 9,248,518 B2 | 2/2016 | Elliston et al. | |
| 9,375,796 B2 | 6/2016 | Elliston et al. | |
| 9,731,365 B2 | 8/2017 | Cranna | |
| 9,821,391 B2 | 11/2017 | Tsujimoto et al. | |
| 10,112,245 B2 * | 10/2018 | Hunter et al. | |
| 2002/0170410 A1 * | 11/2002 | Gittel .................. | B23D 61/021 |
| | | | 83/835 |
| 2004/0182218 A1 | 9/2004 | Chao | |
| 2006/0156892 A1 | 7/2006 | Losse | |
| 2006/0207398 A1 | 9/2006 | Nicolson et al. | |
| 2012/0279372 A1 | 11/2012 | Kullmann et al. | |
| 2013/0032014 A1 | 2/2013 | Elliston et al. | |
| 2014/0150620 A1 | 6/2014 | Elliston et al. | |
| 2017/0120355 A1 | 5/2017 | Brutscher et al. | |
| 2018/0099341 A1 | 4/2018 | Rakurty et al. | |
| 2021/0237181 A1 * | 8/2021 | Nishikawa ........... | B23D 61/021 |

FOREIGN PATENT DOCUMENTS

| | | | | |
|---|---|---|---|---|
| WO | 1996021545 A1 | 1/1996 | | |
| WO | WO-9621545 A1 * | 7/1996 | ........... | B23D 61/021 |
| WO | 2011038844 A1 | 4/2011 | | |

* cited by examiner

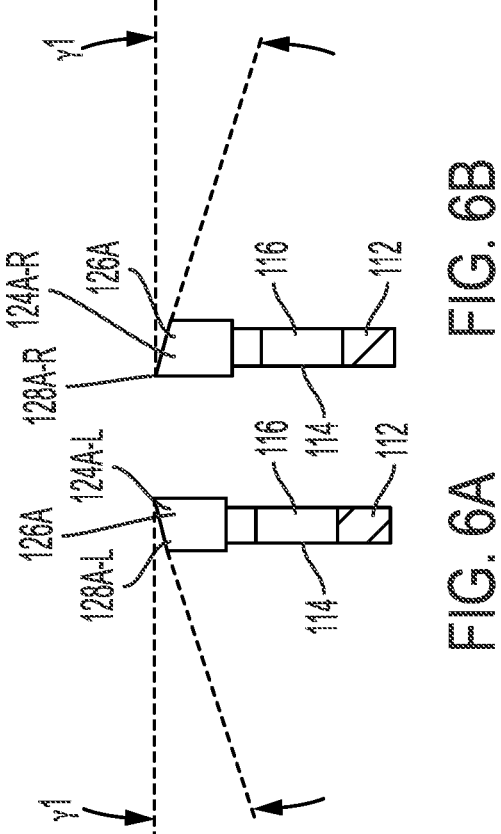
FIG. 6A
FIG. 6B
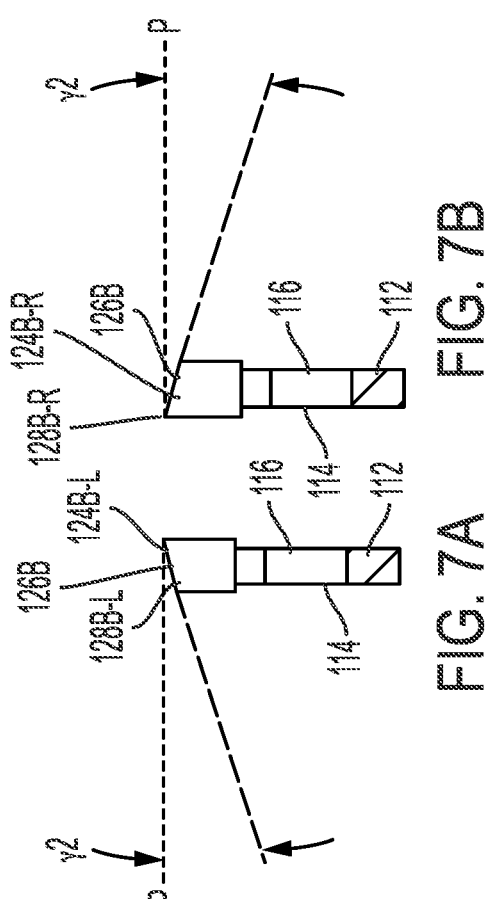
FIG. 7A
FIG. 7B

CIRCULAR SAW BLADE

RELATED APPLICATION

This application claims priority, under 35 U.S.C. § 120, as a continuation of U.S. patent application Ser. No. 16/825, 020, filed Mar. 20, 2020, titled "Circular Saw Blade," which claims priority under 35 U.S.C. § 119(e), to U.S. Provisional Application No. 62/829,106, filed Apr. 4, 2019, each of which is incorporated by reference.

TECHNICAL FIELD

This application relates to circular saw blades.

BACKGROUND

FIGS. 1-3B show an example of an existing circular saw blade 10. The saw blade 10 includes a generally circular blade body 12 having a first side face 14 and an opposite second side face 16. A plurality of cutting tooth holders 18 are coupled to a periphery 20 of the blade body 12. Around the periphery 20 are a plurality of gullets 22, each disposed between two adjacent cutting tooth holders 18. Each cutting tooth holder 18 supports one of a plurality of cutting teeth 24. Each tooth 24 may be generally prismatic in shape and has a rake face 26, a relief face 28, a cutting edge 30, and a pair of lateral faces 32, 33.

Each rake face 26 faces toward an adjacent gullet 22, extends transverse to the first and second side faces 14, 16, and is disposed at a rake angle α relative to a radius R of the blade body 12. Each relief face 28 extends from the rake face 26 toward the tooth holder 18 that is supporting the cutting tooth 24, extends transverse to the first and second side faces 14, 16, and is disposed at a relief angle β relative a line T tangent to a circumference C of the saw blade 10. The cutting edge 30 is disposed at a junction between the rake face 26 and the relief face 28 and extends transverse to the first and second side faces 14, 16. Each relief face 28 is also beveled toward one of the first side face 14 and the second side face 16 in an alternating top bevel (ATB) pattern at a top bevel angle γ relative to a plane P perpendicular to the blade body 12. The rake angle α, relief angle β, and top bevel angle γ are the same for all teeth 24 on the saw blade.

In such existing saw blades there is generally a trade-off between life (i.e., number of cuts that can be achieved before blade feels dull or cannot make a cut in a reasonable amount of time or when applying a reasonable amount of force) and durability (i.e., how often a tooth on the blade chips or breaks). Generally, wear life increases and durability decreases with increases in the rake angle, relief angle, and/or top bevel angle. On the other hand, generally, durability increases and life decreases with decreases in the rake angle, relief angle, and/or top bevel angle. Therefore, the rake angle, relief angle, and top bevel angle are often selected so as to optimize either life and cutting speed (i.e., for more efficient and faster cutting) or durability (i.e., for cutting more abusive materials), but not both. Saw blades optimized for more efficient cutting tend to have their teeth chip and break when cutting more abusive materials such as wood with nails, which can lead to a cascade of broken teeth and premature failure of the saw blade. Saw blades that are optimized for durability tend to dull quickly, requiring more frequent blade changes. Other saw blades that attempt to compromise between life and durability tend to perform below average in both.

SUMMARY

In an aspect, a circular saw blade includes a generally circular blade body having a first side face and an opposite second side face, a plurality of cutting tooth holders coupled to a periphery of the blade body, a plurality of gullets, and a plurality of cutting teeth. Each gullet is disposed between two adjacent cutting tooth holders. Each cutting tooth is supported by one of the cutting tooth holders and has a rake face facing toward an adjacent gullet and extending transverse to the first and second side faces, a relief face extending from the rake face toward the tooth holder that is supporting the cutting tooth and extending transverse to the first and second side faces, and a cutting edge at a junction between the rake face and a relief face and extending transverse to the first and second side faces. The cutting teeth alternate between at least one first set of cutting teeth and at least one second set of cutting teeth around the periphery of the blade body. Each first set of cutting teeth includes at least two efficient cutting teeth, each having the relief face beveled toward one of the first side face and the second side face in an alternating top bevel (ATB) pattern at a first top bevel angle, the rake face disposed at a first rake angle relative to a radius of the blade body, and the relief face disposed at a first relief angle relative to a line tangent to the periphery of the blade body. Each second set of cutting teeth includes at least two robust cutting teeth, each having the relief faces beveled toward one of the first side face and the second side face in an alternating top bevel (ATB) pattern at a second top bevel angle, the rake face disposed at a second rake angle relative to a radius of the blade body, and the relief face disposed at a second relief angle relative a line tangent to the periphery of the blade body. At least two out of the following three conditions are satisfied: (a) each second bevel angle is less than each first bevel angle; (b) each second rake angle is less than each first rake angle, and (c) each second relief angle is less than each first relief angle.

Implementations of this aspect may include one or more of the following features. If only two of the three conditions are satisfied, then one of the following additional conditions is also satisfied: (a) each second bevel angle is approximately equal to the first bevel angle; (b) each second rake angle is approximately equal to each first rake angle; and (c) each second relief angle is approximately equal to each first relief angle. In another implementation all of the three conditions are satisfied. For example, each second bevel angle may be less than each first bevel angle, each second rake angle may be less than each first rake angle, and each second relief angle may be approximately equal to each first relief angle. In another example, each second bevel angle may be approximately equal to each first bevel angle, each second rake angle may be less than each first rake angle, and each second relief angle is less than each first relief angle. In yet another example, each second bevel angle may be less than each first bevel angle, each second rake angle may be approximately equal to each first rake angle, and each second relief angle may be less than each first relief angle.

Each first rake angle may be from approximately 16° to approximately 22° and each second rake angle may be from approximately 8° to approximately 16°. Each first relief angle may be from approximately 16° to approximately 20° and each second rake angle may from approximately 8° to approximately 14°. Each first top bevel angle may be from approximately 16° to approximately 22° and each second top bevel angle may be from approximately 8° to approximately 14°. Each cutting tooth may include one or more of a carbide, cermet, polycrystalline diamond (PCD) or high speed steel (HSS) cutting insert. The first set of teeth and the second set of teeth may be configured so that the second set of teeth receive a greater percentage of a total chip load on the plurality of teeth than the first set of teeth. The first set of teeth may receive approximately 5% to 35% of the total chip load. The second set of teeth may receive approximately 65% to 95% of the total chip load.

Each second set of teeth may further include a raker tooth. Each raker tooth may have the relief face unbeveled toward the first side face and the second side face, the rake face disposed at the second rake angle relative to a radius of the blade body, and the relief face disposed at the second relief angle relative a line tangent to the periphery of the blade body. Each second set of teeth are arranged in an alternating top bevel plus raker (ATB+R) pattern. The raker tooth may have a height approximately equal to a height of each of the beveled teeth in the second set of teeth or a height less than a height of each of the beveled teeth in the second set of teeth. Each first set of teeth and each second set of teeth immediately following the first set of teeth in a direction opposite a cutting direction of the saw blade may be configured such that, if one tooth in the first set of teeth breaks, the chip load in the immediately following second set of teeth increases by less than 45%.

In another aspect, a circular saw blade includes a generally circular blade body having a first side face and an opposite second side face, a plurality of cutting tooth holders coupled to a periphery of the blade body, a plurality of gullets, and a plurality of teeth. Each gullet is disposed between two adjacent cutting tooth holders. Each cutting tooth is supported by one of the cutting tooth holders and has a rake face facing toward an adjacent gullet and extending transverse to the first and second side faces, a relief face extending from the rake face toward the tooth holder that is supporting the cutting tooth and extending transverse to the first and second side faces, and a cutting edge at a junction between the rake face and a relief face and extending transverse to the first and second side faces. The cutting teeth alternate between at least one first set of cutting teeth and at least one second set of cutting teeth around the periphery of the blade body. Each first set of cutting teeth include at least two efficient cutting teeth. Each second set of cutting teeth comprising at least one robust cutting tooth. The first set of teeth and the second set of teeth are configured so that the second set of teeth receive a greater percentage of a total chip load on the plurality of teeth than the first set of teeth.

Implementations of this aspect may include one or more of the following features. The first set of teeth may receive approximately 5% to 45% of the total chip load. The second set of teeth receive approximately 55% to 95% of the total chip load. Each rake face in each first set of cutting teeth may be disposed at a first rake angle relative to a radius of the blade body and each rake face in each second set of cutting teeth may be disposed at a second rake angle relative to a radius of the blade body, the second rake angle less than the first rake angle. Each first rake angle may be from approximately 16° to approximately 22° and each second rake angle may be from approximately 8° to approximately 16°. Each relief face in each first set of cutting teeth may be disposed at a first relief angle relative to a line tangent to the periphery of the blade body and each relief face in each second set of cutting teeth may be disposed at a second rake angle relative to a line tangent to the periphery of the blade body, the second relief angle less than the first relief angle. Each first relief angle may be from approximately 16° to approximately 20° and each second relief angle may be from approximately 8° to approximately 14°. Each second bevel angle may be less than each first bevel angle, each second rake angle may be less than each first rake angle, and each second relief angle may be less than each first relief angle.

The relief faces of each first set of cutting teeth may be beveled toward one of the first side face and the second side face in an alternating top bevel (ATB) pattern at a first top bevel angle and the relief faces of each second set of cutting teeth may be beveled toward one of the first side face and the second side face in an alternating top bevel (ATB) pattern at a second top bevel angle that is less than the first top bevel angle. Each first top bevel angle may be from approximately 16° to approximately 22° and each second top bevel angle may be from approximately 8° to approximately 14°. Each second set of teeth further may include a raker tooth. Each raker tooth may have the relief face unbeveled toward the first side face and the second side face such that each second set of teeth are arranged in an alternating top bevel plus raker (ATB+R) pattern. The raker tooth may have a height approximately equal to or less than a height of each of the beveled teeth in the second set of teeth.

The relief faces of each first set of cutting teeth may be beveled toward one of the first side face and the second side face in an alternating top bevel (ATB) pattern at a first top bevel angle, and each second set of cutting teeth may be a raker tooth. The relief face of each second set of cutting teeth may be unbeveled, may have a flat top face and beveled corner faces, or may be roof shaped. Each cutting tooth may include a carbide, cermet, polycrystalline diamond (PCD) or high speed steel (HSS) cutting insert. Each first set of teeth and each second set of teeth immediately following the first set of teeth in a direction opposite a cutting direction of the saw blade may be configured such that, if one tooth in the first set of teeth breaks, the chip load in the immediately following second set of teeth increases by less than 45%.

In another aspect, a circular saw blade includes a generally circular blade body having a first side face and an opposite second side face, a plurality of cutting tooth holders coupled to a periphery of the blade body, a plurality of gullets, and a plurality of cutting teeth. Each gullet is disposed between two adjacent cutting tooth holders. Each cutting tooth is supported by one of the cutting tooth holders and has a rake face facing toward an adjacent gullet and extending transverse to the first and second side faces, a relief face extending from the rake face toward the tooth holder that is supporting the cutting tooth and extending transverse to the first and second side faces, and a cutting edge at a junction between the rake face and a relief face and extending transverse to the first and second side faces. The cutting teeth repeatedly alternate between a first set of cutting teeth and a second set of cutting teeth immediately following the first set of cutting teeth in a direction opposite a cutting direction of the saw blade around the periphery of the blade body. Each first set of cutting teeth includes at least two efficient cutting teeth. Each second set of cutting teeth comprising at least one robust cutting tooth. Each first set of teeth and each second set of teeth are configured such that, if one tooth in the first set of teeth breaks, the chip load in the immediately following second set of teeth increases by less than 45%.

Implementations of this aspect may include one or more of the following features. The first set of teeth and the second set of teeth may be configured so that, prior to any teeth breaking, the second set of teeth receive a greater percentage of a total chip load on the plurality of teeth than the first set of teeth. The first set of teeth may receive approximately 5% to 45% of the total chip load. The second set of teeth receive approximately 55% to 95% of the total chip load. Each rake face in each first set of cutting teeth may be disposed at a first rake angle relative to a radius of the blade body and each rake face in each second set of cutting teeth may be disposed at a second rake angle relative to a radius of the blade body, the second rake angle less than the first rake angle. Each first rake angle may be from approximately 16° to approximately 22° and each second rake angle may be from approximately 8° to approximately 16°. Each relief face in each first set of cutting teeth may be disposed at a first relief angle relative to a line tangent to the periphery of the blade body and each relief face in each second set of cutting teeth may be disposed at a second rake angle relative to a line tangent to the periphery of the blade body, the second relief angle less than the first relief angle. Each first relief angle may be from approximately 16° to approximately 20° and each second relief angle may be from approximately 8° to approximately 14°. Each second bevel angle may be less than each first bevel angle, each second rake angle may be less than each first rake angle, and each second relief angle may be less than each first relief angle.

The relief faces of each first set of cutting teeth may be beveled toward one of the first side face and the second side face in an alternating top bevel (ATB) pattern at a first top bevel angle and the relief faces of each second set of cutting teeth may be beveled toward one of the first side face and the second side face in an alternating top bevel (ATB) pattern at a second top bevel angle that is less than the first top bevel angle. Each first top bevel angle may be from approximately 16° to approximately 22° and each second top bevel angle may be from approximately 8° to approximately 14°. Each second set of teeth further may include a raker tooth. Each raker tooth may have the relief face unbeveled toward the first side face and the second side face such that each second set of teeth are arranged in an alternating top bevel plus raker (ATB+R) pattern. The raker tooth may have a height approximately equal to or less than a height of each of the beveled teeth in the second set of teeth.

The relief faces of each first set of cutting teeth may be beveled toward one of the first side face and the second side face in an alternating top bevel (ATB) pattern at a first top bevel angle, and each second set of cutting teeth may be a raker tooth. The relief face of each second set of cutting teeth may be unbeveled, may have a flat top face and beveled corner faces, or may be roof shaped. Each cutting tooth may include a carbide, cermet, polycrystalline diamond (PCD) or high speed steel (HSS) cutting insert.

In another aspect, a circular saw blade includes a generally circular blade body having a first side face and an opposite second side face, a plurality of cutting tooth holders coupled to a periphery of the blade body, a plurality of gullets, and a plurality of cutting teeth. Each gullet is disposed between two adjacent cutting tooth holders. Each cutting tooth is supported by one of the cutting tooth holders and has a rake face facing toward an adjacent gullet and extending transverse to the first and second side faces, a relief face extending from the rake face toward the tooth holder that is supporting the cutting tooth and extending transverse to the first and second side faces, and a cutting edge at a junction between the rake face and a relief face and extending transverse to the first and second side faces. The cutting teeth alternate between at least one first set of cutting teeth and at least one second set of cutting teeth around the periphery of the blade body. Each first set of cutting teeth includes at least two efficient cutting teeth, each having the relief face beveled toward one of the first side face and the second side face in an alternating top bevel (ATB) pattern at a first top bevel angle, the rake face disposed at a first rake angle relative to a radius of the blade body, and the relief face disposed at a first relief angle relative a line tangent to the periphery of the blade body. Each second set of cutting teeth includes at least one robust raker cutting tooth, each having the rake face disposed at a second rake angle relative to a radius of the blade body, and the relief face disposed at a second relief angle relative a line tangent to the periphery of the blade body. At least one out of the following two conditions are satisfied: (a) each second rake angle is less than each first rake angle, and (b) each second relief angle is less than each first relief angle.

Implementations of this aspect may include one or more of the following features. If only one of the two conditions are satisfied, then one of the following additional conditions may be also satisfied: (a) each second rake angle is approximately equal to each first rake angle; and (b) each second relief angle is approximately equal to each first relief angle. Alternatively, each of the two conditions may be satisfied. Each second bevel angle may be approximately equal to each first bevel angle and each second rake angle may be less than or equal to each first rake angle. Each first rake angle may be from approximately 17° to approximately 21° and each second rake angle may be from approximately 12° to approximately 17°. Each first relief angle may be from approximately 12° to approximately 18° and each second relief angle may be from approximately 10° to approximately 16°.

Each cutting tooth may include a carbide, cermet, polycrystalline diamond (PCD) or high speed steel (HSS) cutting insert. The first set of teeth and the second set of teeth may be configured so that the second set of teeth receive a greater percentage of a total chip load on the plurality of teeth than the first set of teeth. The first set of teeth may receive approximately less than 50% of the total chip load. The second set of teeth receive approximately greater than 50% of the total chip load. Each first set of teeth and each second set of teeth immediately following the first set of teeth in a direction opposite a cutting direction of the saw blade may be configured such that, if one tooth in the first set of teeth breaks, the chip load in the immediately following second set of teeth increases by less than 45%. The relief face of each second set of cutting teeth may be unbeveled, may have a flat top face and beveled corner faces, or may be roof shaped.

Advantages may include one or more of the following. Alternating between sets of efficient teeth and robust teeth creates a blade design where the efficient teeth can increase chip clearance, as they can have rake angles, relief angles, and/or top bevel angles that are larger than what would be typically expected on a circular saw blade. This can be done because the robust teeth with smaller rake angles, relief angles, and/or top bevel angles can withstand greater impact loads and inhibit propagation of broken teeth around the periphery of the saw blade. This unexpectedly results in dramatic improvements in both wear life and durability of the saw blade. These and other advantages and features will be apparent from the description, the drawings, and the claims.

BRIEF DESCRIPTION OF THE DRAWINGS

FIGS. 6A and 6B are cross-sectional views taken along lines 6A-6A and 6B-6B in FIG. 5.

FIGS. 7A and 7B are cross-sectional views taken along lines 7A-7A and 7B-7B in FIG. 5.

FIGS. 16A and 16B are cross-sectional views taken along lines 16A-16A and 16B-16B in

FIG. 15.

FIGS. 17A, 17B, and 17C are cross-sectional views taken along lines 17A-17A, 17B-17B, and 17C-17C in FIG. 15.

DETAILED DESCRIPTION

Figure 1:
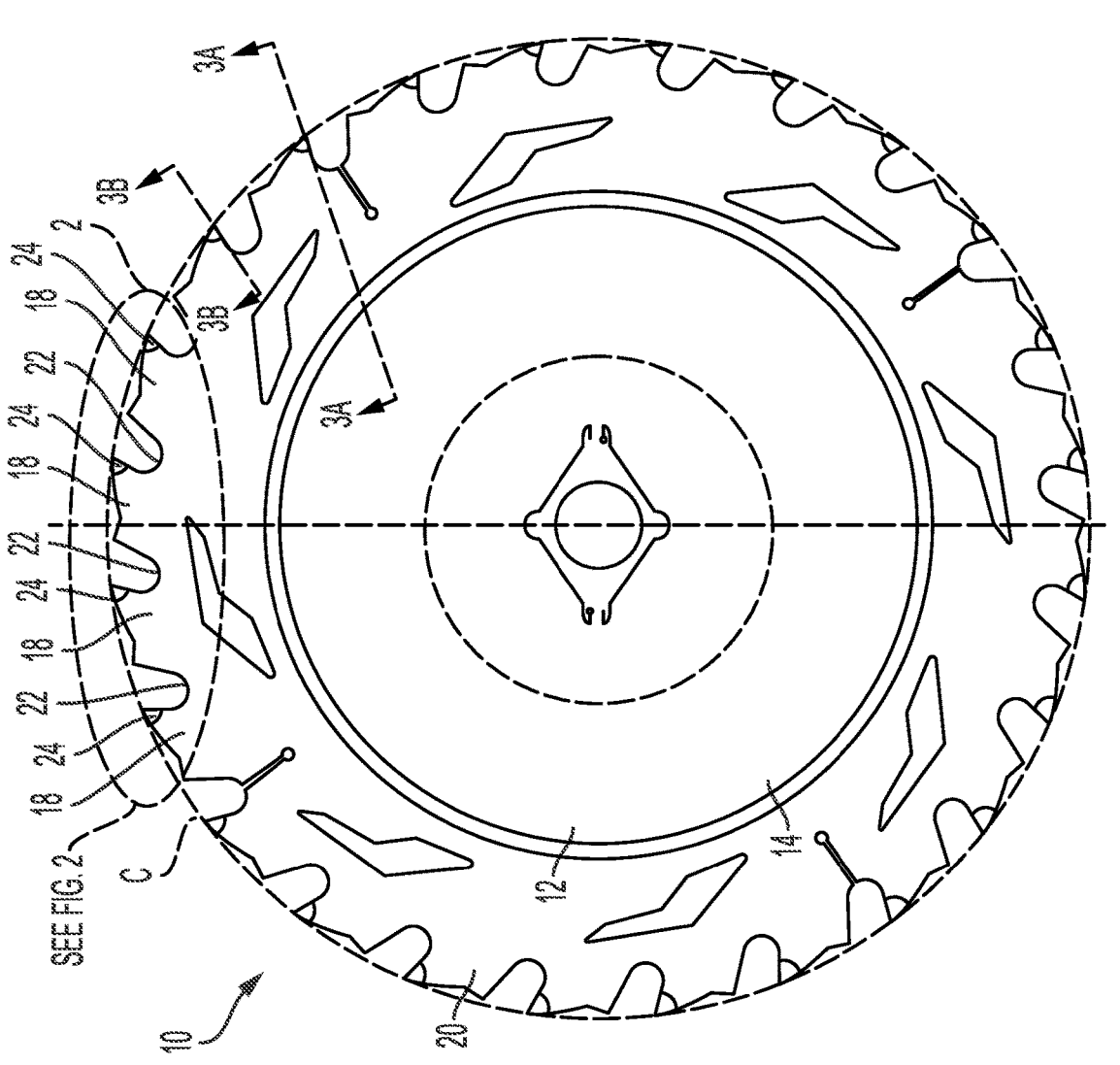
FIG. 1 is a side view of an existing circular saw blade.
Figure 2:
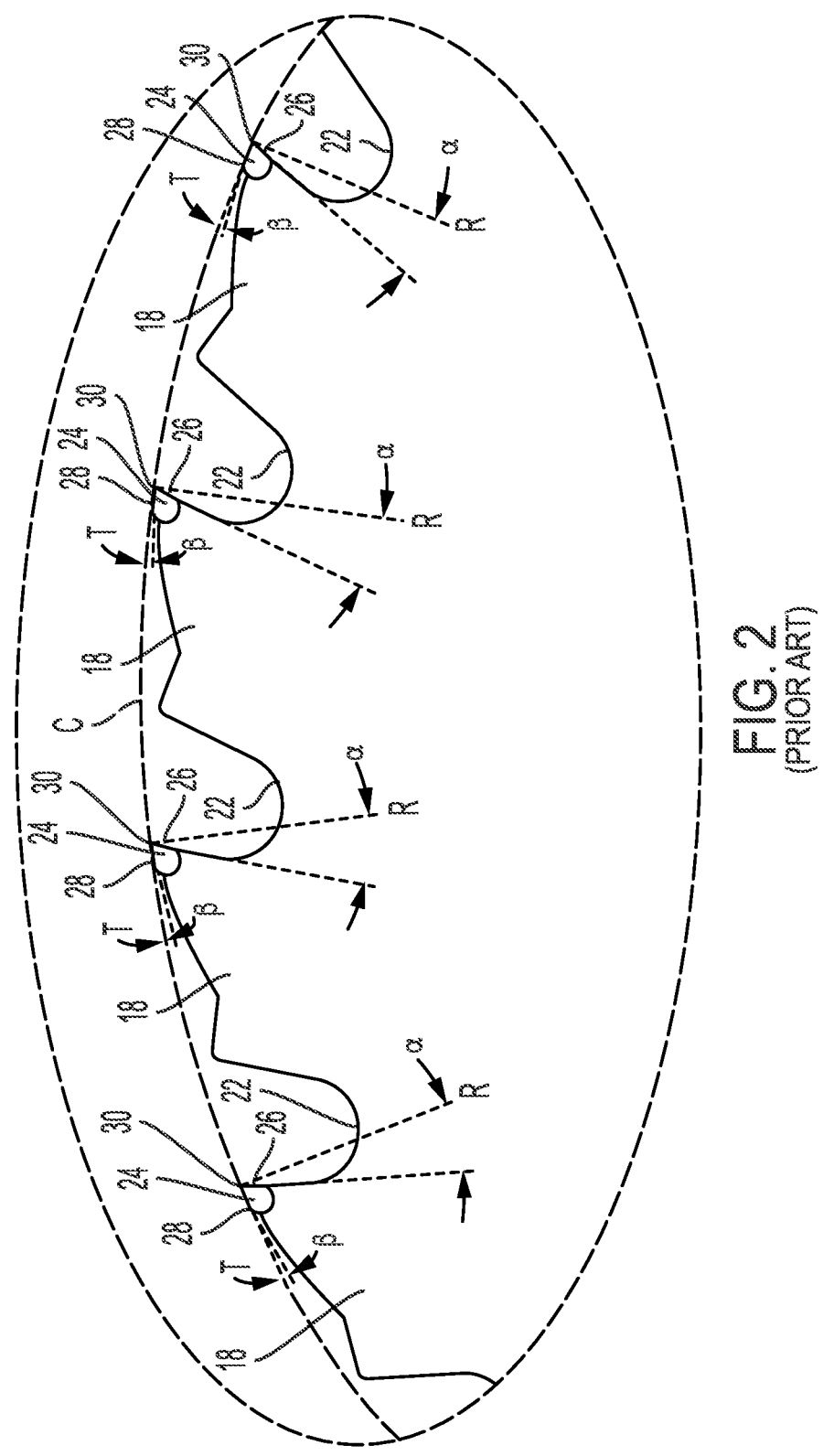
FIG. 2 is a close up view of a portion 2 of the saw blade of FIG. 1.
Figure 3B:
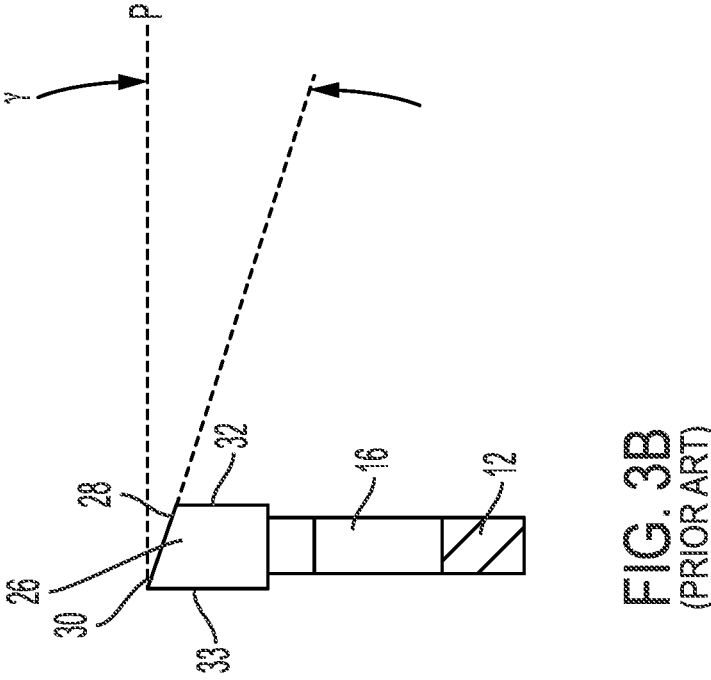
FIG. 3B is a cross-sectional view of the saw blade of FIG. 1 taken along line 3B-3B.
Figure 3A:
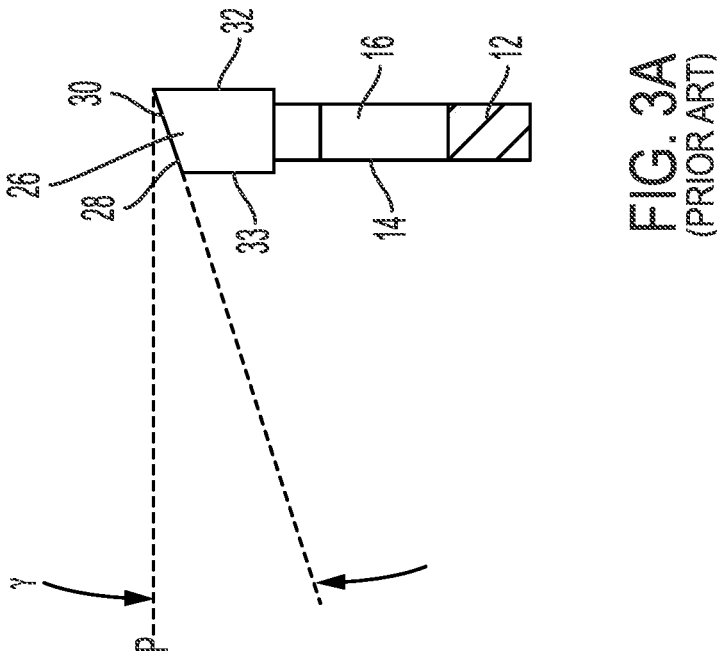
FIG. 3A is a cross-sectional view of the saw blade of FIG. 1 taken along line 3A-3A.
Figure 4:
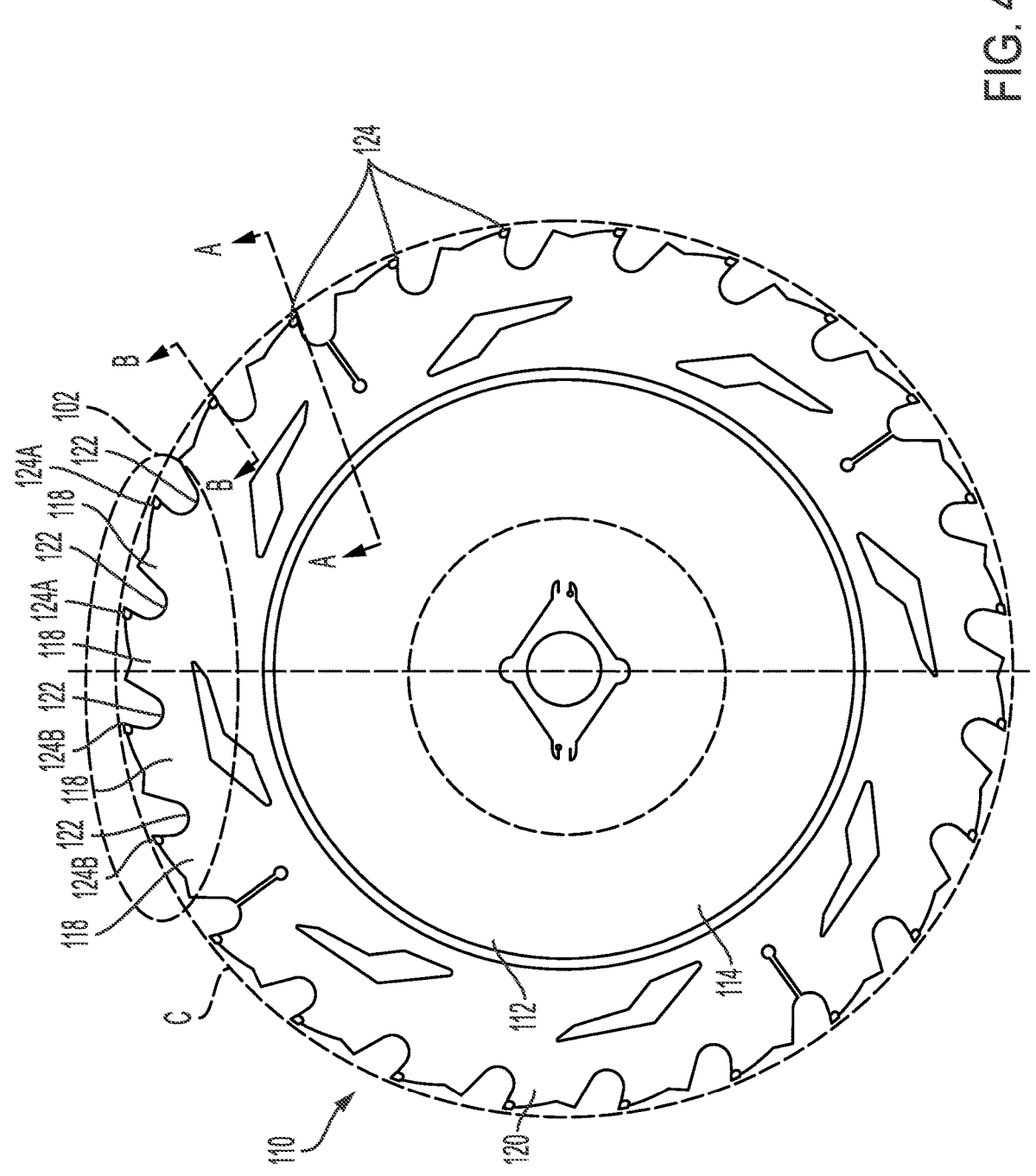
FIG. 4 is a side view of an embodiment of a circular saw blade according to this patent application.
Figure 5:
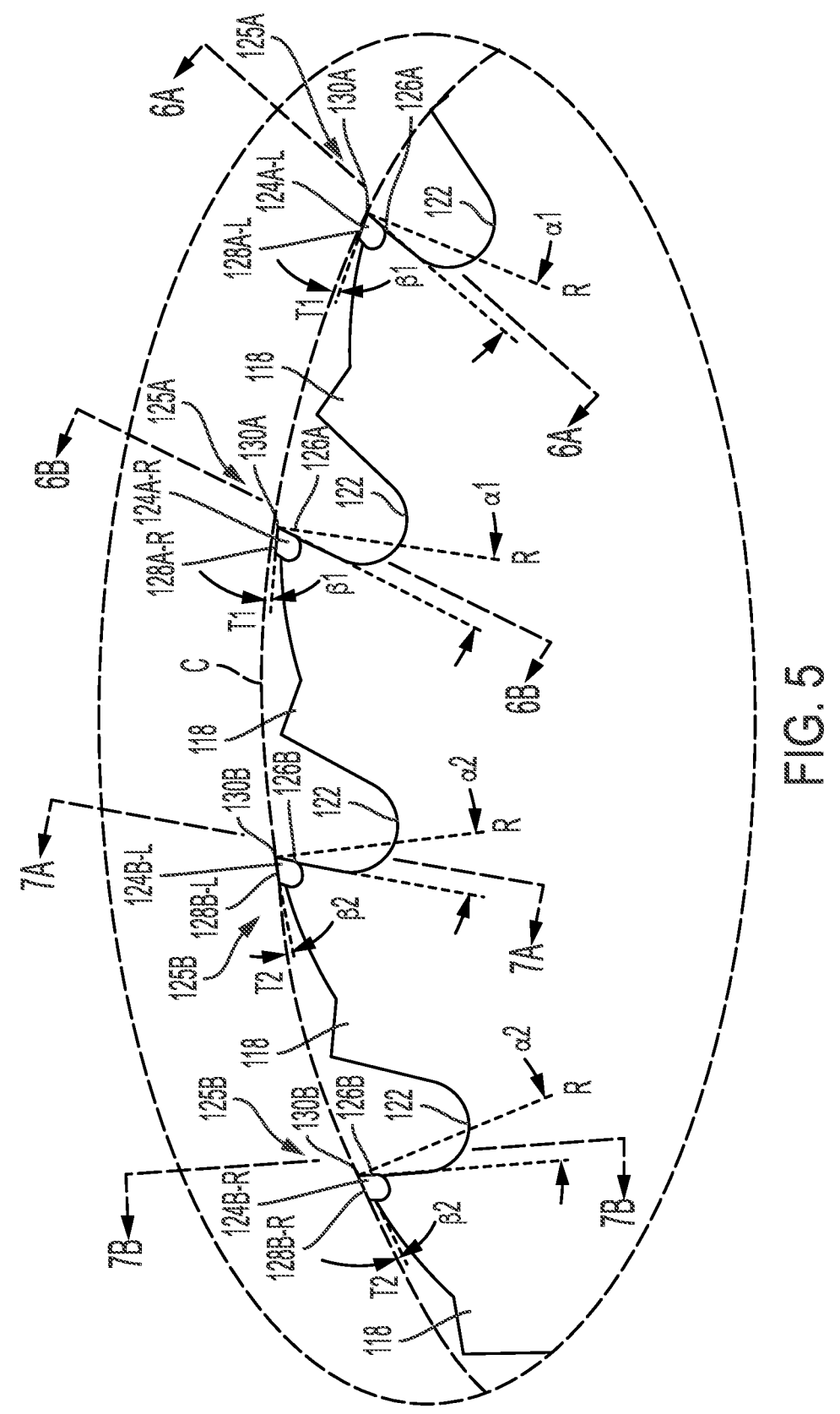
FIG. 5 is a close up view of a portion 102 of the saw blade of FIG. 4.

Referring to FIGS. 4-7B, in an embodiment, a circular saw blade 110 includes a generally circular blade body 112 having a first side face 114 and an opposite second side face 116. A plurality of cutting tooth holders 118 are coupled to a periphery 120 of the blade body 112. Around the periphery 120 are a plurality of gullets 122, each disposed between two adjacent cutting tooth holders 118. Each cutting tooth holder 118 supports one of a plurality of cutting teeth 124. Each tooth 124 may be generally prismatic in shape. The cutting teeth 124 alternate between first sets of cutting teeth 125A and second sets of cutting teeth 125B around the periphery of the blade body. The cutting teeth 124 can be composed of a harder material than the blade body, such as one or more of carbide, cermet, polycrystalline diamond (PCD) or high speed steel (HSS).

Each first set of cutting teeth 125A comprises at least two (e.g., a pair) of efficient cutting teeth 124A. Each efficient cutting tooth 124A has a first rake face 126A disposed at a first rake angle $\alpha 1$ relative to a radius R of the blade body and a first relief face 128A disposed at a first relief angle $\beta 1$ relative a line T1 tangent to a circumference C of the saw blade 110. In addition, the first cutting teeth 124A alternate between a left beveled cutting tooth 124A-L with a left top beveled relief face 128A-L and a right beveled cutting tooth 124A-R a right top beveled relief face 128A-R in an alternating top bevel (ATB) pattern. The relief faces 128A-L and 128A-R are beveled at a first top bevel angle $\gamma 1$.

Each second set of cutting teeth 125B comprises at least two (e.g., a pair) of robust cutting teeth 124B. Each robust cutting tooth 124B has a first rake face 126B disposed at a second rake angle $\alpha 1$ relative to a radius R of the blade body and a first relief face 128B disposed at a second relief angle $\beta 2$ relative a line T2 tangent to the circumference C of the saw blade 110. In addition, the second teeth 124B alternate between a left beveled tooth 124B-L with a left top beveled relief face 128B-L and a right beveled tooth 124B-R with a right top beveled relief face 128B-R in an alternating top bevel (ATB) pattern. The relief faces 128B-L and 128B-R are beveled at a second top bevel angle $\gamma 2$.

At least two out of the following three conditions are satisfied: (a) each second bevel angle $\gamma 2$ is less than each first bevel angle $\gamma 1$; (b) each second rake angle $\alpha 2$ is less than each first rake angle $\alpha 1$, and (c) each second relief angle $\beta 2$ is less than each first relief angle $\beta 1$. For example, at least two of the following three conditions may be satisfied: (a) each first top bevel angle $\gamma 1$ may be from approximately 16° to approximately 22° (e.g., approximately 18°) and each second top bevel angle $\gamma 2$ may be from approximately 8° to approximately 14° (e.g., approximately 13°); (b) each first rake angle $\alpha 1$ may be from approximately 16° to approximately 22° (e.g., approximately 20°), and each second rake angle $\alpha 2$ may be from approximately 8° to approximately 16° (e.g., approximately 12°); and (c) each first relief angle $\beta 1$ may be from approximately 16° to approximately 20° (e.g., approximately 16°) and each second rake angle $\beta 2$ may be from approximately 8° to approximately 14° (e.g., approximately) 10°. Note that in other embodiments, all three of these conditions may be satisfied.

If only two of the aforementioned three conditions are satisfied, then one of the following three conditions also may be satisfied: (a) each second bevel angle $\gamma 2$ may be approximately equal to the first bevel angle $\gamma 1$; (b) each second rake angle $\alpha 2$ may be approximately equal to each first rake angle $\alpha 1$; and (c) each second relief angle $\beta 2$ may be approximately equal to each first relief angle $\beta 1$. For example, one of the following three conditions may be satisfied: (a) each first top bevel angle $\gamma 1$ may be from approximately 8° to approximately 22° (e.g., approximately 16°); (b) each first rake angle $\alpha 1$ and each second rake angle $\alpha 2$ may be from approximately 8° to approximately 22° (e.g., approximately 15°); and (c) each first relief angle β1 and each second rake angle β2 may be from approximately 8° to approximately 20° (e.g., approximately 16°).

The following Table 1 shows four example embodiments of circular saw blades in accordance with this disclosure:

TABLE 1

|  | Embodiment 1 | Embodiment 2 | Embodiment 3 | Embodiment 4 |
|---|---|---|---|---|
| First rake angle α1 | 20° | 15° | 20° | 20° |
| Second rake angle α2 | 12° | 15° | 12° | 12° |
| First relief angle β1 | 16° | 16° | 16° | 16° |
| Second relief angle β2 | 16° | 10° | 10° | 10° |
| First top bevel angle γ1 | 18° | 20° | 18° | 16° |
| Second top bevel angle γ2 | 13° | 10° | 13° | 16° |

In each of these embodiments, the rake angles, relief angles, and top bevel angles on the efficient teeth 124A makes these teeth more acute and aggressive, configuring these teeth to provide increased life for more efficient cutting through a workpiece. In contrast, the rake angles, relief angles, and top bevel angles on the robust teeth 124B makes these teeth more obtuse and blunt, configuring these teeth to have increased durability with less chipping and breaking of these teeth when cutting abrasive materials such as wood with embedded nails.

Referring also to FIGS. 8A-10B, schematic illustrations of the chip loads on circular saw blades illustrate how the saw blades of the present disclosure mitigate and reduce the cascading effect of a tooth breakage in the saw blade. These figures schematically illustrate the surface area upon which each tooth receives an impact force when cutting a workpiece. The surface area is proportional to the amount of force received by each tooth. Thus, a larger surface area receives a greater force than a smaller surface area.

Figure 8A:
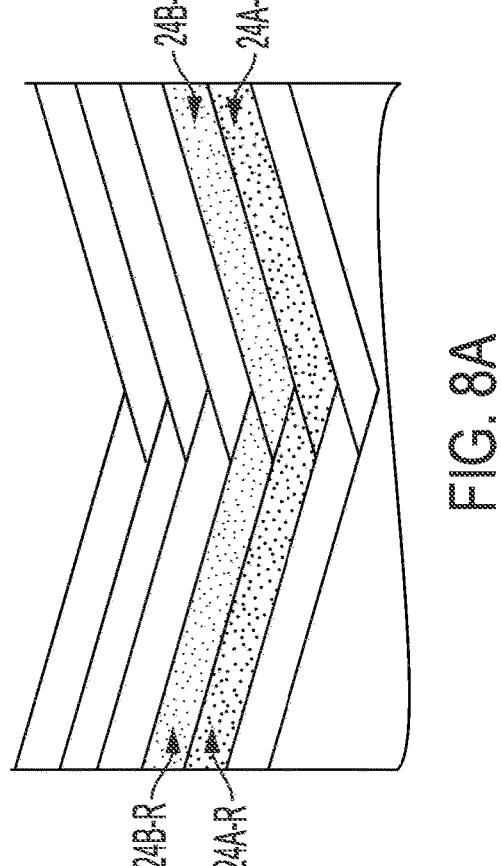
FIGS. 8A and 8B are schematic chip model diagrams of the cutting teeth of the saw blade of FIG. 1.
Figure 8B:
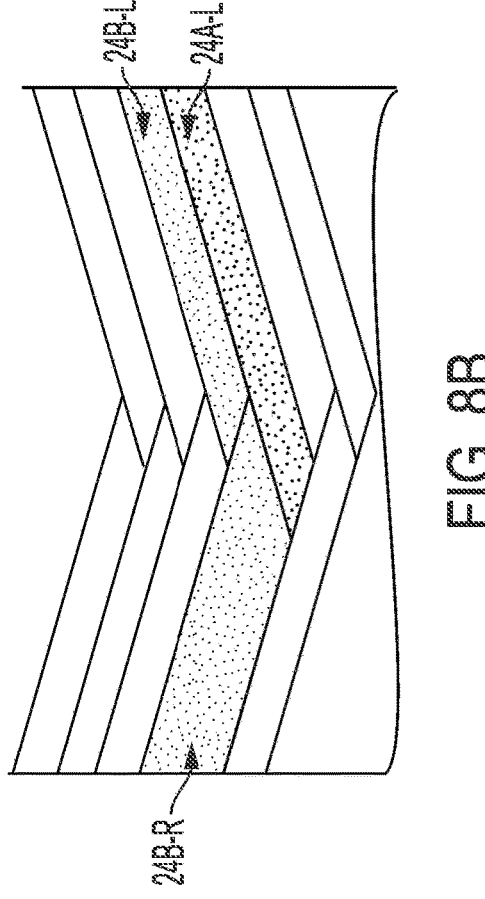

FIGS. 8A-8B schematically illustrates the impacted surface area of the teeth in an existing saw blade, such as the one illustrated in FIGS. 1-3B. As shown in FIG. 8A, because each tooth 24 has the same rake angle, relief angle, and alternating top bevel angle, initially each tooth has substantially the same surface area exposed to impact and receives substantially equal shares of the impact force. For example, when using a 24-tooth 1.5 mm kerf circular saw blade with a 16° alternating top bevel, operating at 5000 rpm with a 7.5 ft./min. feed rate, the consecutive left top beveled teeth 24A-L, 24B-L and right top beveled teeth 24A-R, 24B-R each has an exposed surface area of approximately 0.080 mm². As shown in FIG. 8B, if the first right beveled tooth 24A-R breaks, then the first left beveled tooth 24A-L and the second right beveled tooth 24B-R each have a larger exposed surface area (e.g., approximately 0.097 mm² and 0.143 mm², respectively). Thus, the impact force on the first left beveled tooth 24A-L increases (e.g., by approximately 21%) and the impact force on the second right beveled tooth 24B-R increases (e.g., by approximately 79%). The large (e.g., greater than 50%) increase in the impact force on the second right beveled tooth 24B-R is much larger than that tooth is designed to handle, and often will lead to breakage of that tooth. This, in turn, often leads to breakage of the next right beveled tooth, and so on. Thus, one broken tooth may cause a cascading series of broken teeth, resulting in premature and catastrophic failure of the saw blade.

Figure 9A:
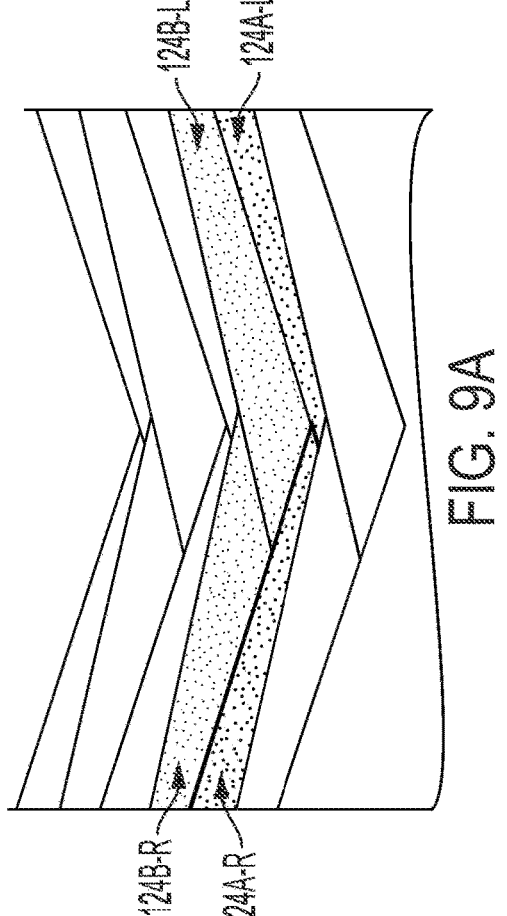
FIGS. 9A and 9B are schematic chip model diagrams of the cutting teeth of a first embodiment of the saw blade of FIG. 4.
Figure 9B:
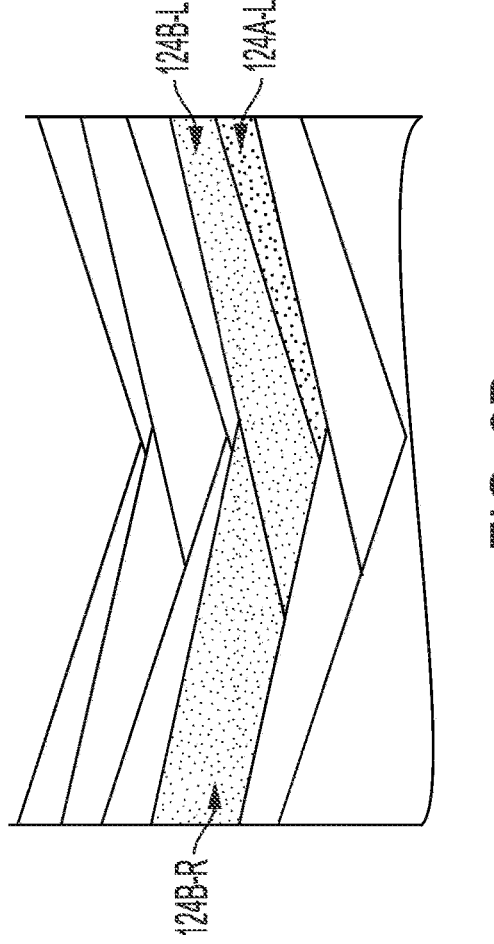
Figures 10A, 10B:
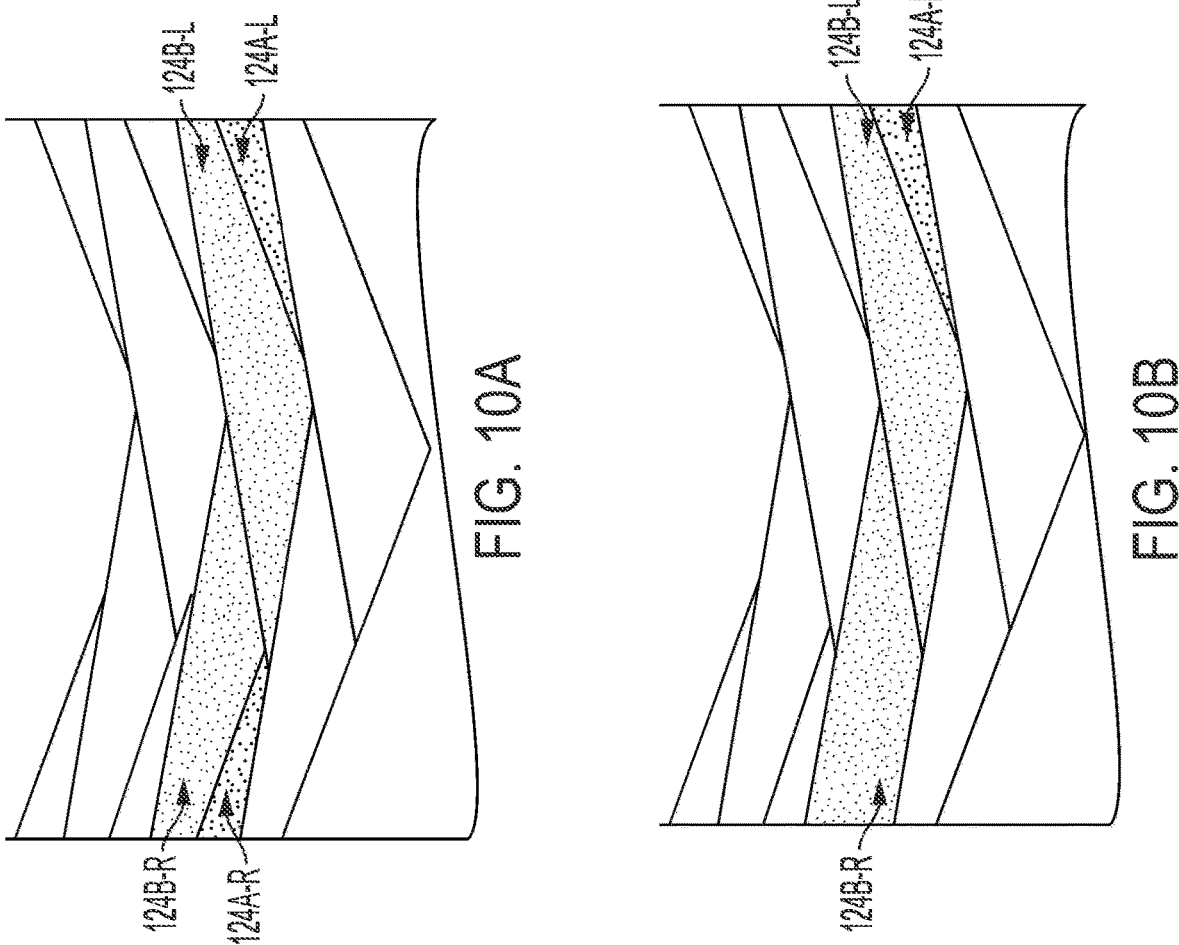
FIGS. 10A and 10B are schematic chip model diagrams of the cutting teeth of a second embodiment of the saw blade of FIG. 4.

In contrast, FIGS. 9A-9B and 10A-10B schematically illustrate the surface area and impact loads on circular saw blades in accordance with Embodiment 1 and Embodiment 2, respectively, of the saw blade shown in FIGS. 4-7B. As shown in FIGS. 9A and 10A, initially, the exposed surface area of the efficient teeth 124A-L, 124A-R is less than the exposed surface area of the robust teeth 124B-L, 124B-R. This is done purposefully because the robust teeth 124B-L, 124B-R are more able to withstand impact forces. For example, as shown in FIG. 9A, a circular saw blade in accordance with Embodiment 1 that generates a chip thickness of approximately 0.05 mm, has an exposed surface area of the left and right top beveled efficient teeth 124A-R, 124A-L of approximately 0.051 mm² and 0.049 mm², respectively, and an exposed surface area of the left and right top beveled robust teeth 124B-L, 124B-R of approximately 0.122 mm² and 0.099 mm², respectively. Thus, the efficient teeth 124A-L, 124A-R and the robust teeth 124B-L, 124B-R receive approximately 31% and 69% of the impact load, respectively. In another example, as shown in FIG. 10A, a circular saw blade in accordance with Embodiment 2 that generates a chip thickness of approximately 0.05 mm, has an exposed surface area of the left and right top beveled efficient teeth 124-R, 124-L of approximately 0.027 mm² and 0.027 mm², respectively, and an exposed surface area of the left and right top beveled robust teeth 124B-R, 124B-L of approximately 0.107 mm² and 0.160 mm², respectively. Thus, the efficient teeth 124A-L, 124A-R and the robust teeth 124B-L, 124B-R receive approximately 17% and 83% of the impact load, respectively.

As shown in FIGS. 9B and 10B, if one of the efficient teeth breaks, the exposed surface area of the following robust teeth increases, but by a much smaller percentage than in existing saw blades. For example, as shown in FIG. 9B, in the design of Embodiment 1, if a right top beveled efficient tooth 124A-R breaks, the exposed surface areas of the left and right top beveled robust teeth 124B-R, 124B-L increase (e.g., to approximately 0.138 mm² and 0.134 mm², respectively). Thus, the impact force on the right top beveled robust tooth 124B-R increases (e.g., by approximately 39%) and the impact force on the left top beveled robust tooth 124B-L increases (e.g., by approximately 10%). Similarly, as shown in FIG. 10B, in the design of Embodiment 2, if a right top beveled efficient tooth 124A-R breaks, the exposed surface areas of the right and left top beveled robust teeth 124B-R, 124B-L increase (e.g., to approximately 0.132 mm² and 0.162 mm², respectively). Thus, the impact force on the right top beveled robust tooth 124B-R increases (e.g., by approximately 23%) and the impact force on the left top beveled robust tooth 124B-L increases (e.g., by approximately 1%). In both cases, the increased forces on the robust teeth are sufficiently low (e.g., less than a 45% increase) such that the robust teeth can handle the increased force, which inhibits cascading breakages of teeth around the periphery of the saw blade.

The saw blades described above with respect to FIGS. 4-10B unexpectedly have dramatic increases in both life and durability. It was expected to have an increase in durability based on a theory that replacing some efficient teeth with robust teeth would reduce propagation of tooth fractures around the saw blade. It was also expected that replacing some efficient teeth with robust teeth would lead to a reduction in life based on the theory that there are fewer efficient teeth to remove material from the workpiece. However, unexpectedly, the alternating pattern of efficient teeth and robust teeth described above resulted in significant improvements in both durability and life.

Figure 11:
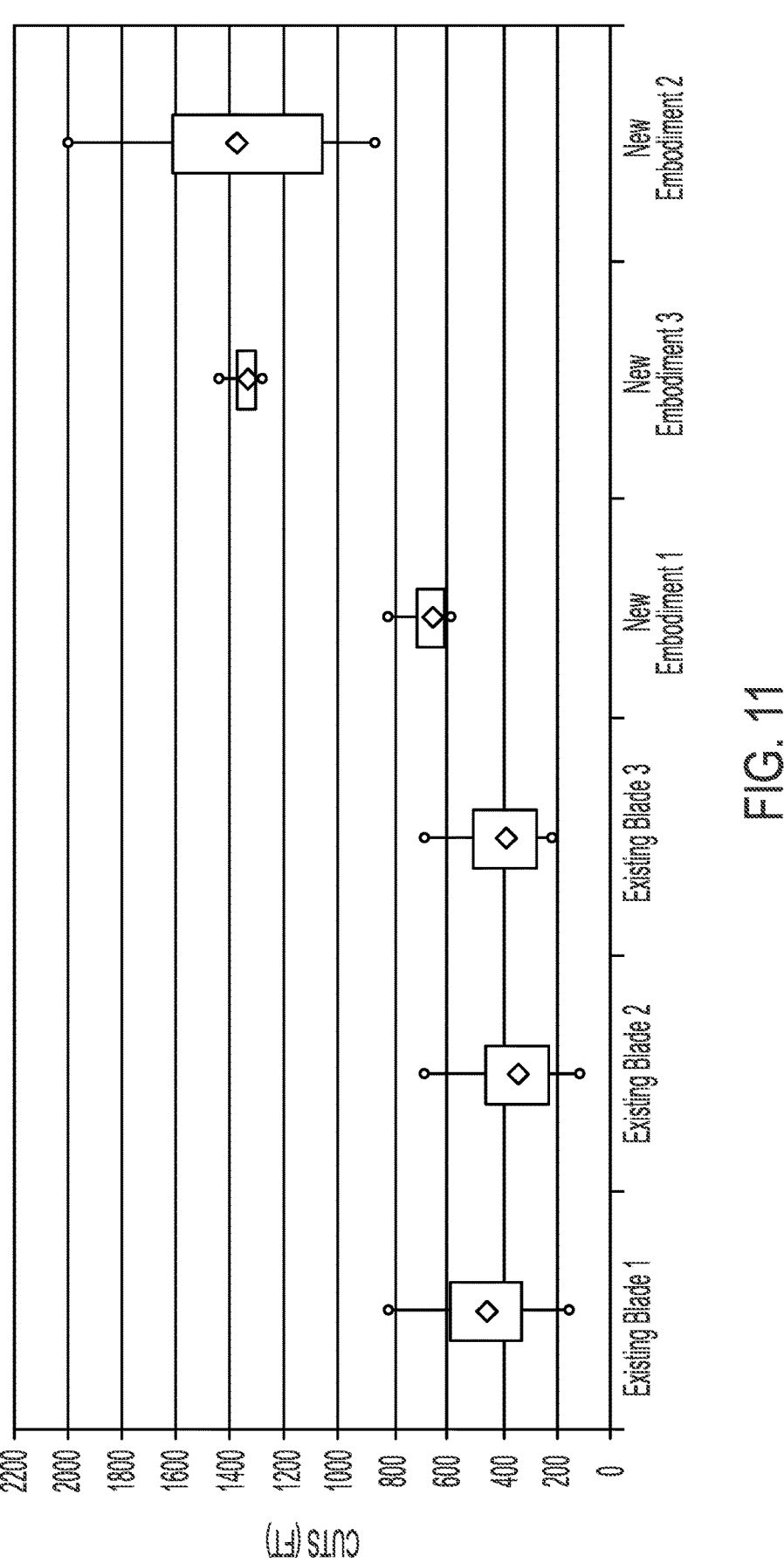
FIG. 11 is a chart illustrating results of life tests of three embodiments of the saw blade of FIG. 4 in particle board.

Referring to FIG. 11, samples of circular saw blades according to Embodiments 1, 2, and 3 described above were compared in a life test to three leading circular saw blades that are considered the best on the market for a combination of life and durability. The saw blades were tested using a powered circular saw coupled to an automatic rig to cut stacks of two sheets of particle board. The rig senses the amount of cutting force. The blade is considered to have reached its end of life when the cutting force exceeds 6 pounds. The total length of particle board cut determines which saw blades have the longest life. As shown in FIG. 11, the three existing circular saw blades cut an average of approximately 375 to 425 feet of particle board. The saw blade of Embodiment 1 of FIG. 4 cut an average of approximately 650 feet (an improvement of approximately 53% to approximately 73%). The saw blade of Embodiment 2 of FIG. 4 cut an average of approximately 1375 feet (an improvement of approximately 223% to approximately 267%), and Embodiment 3 cut an average of approximately 1300 feet (an improvement of approximately 206% to approximately 247%). Thus, each of the embodiments of the saw blade of FIG. 4 demonstrated dramatic and unexpected improvements in life.

Figure 12:
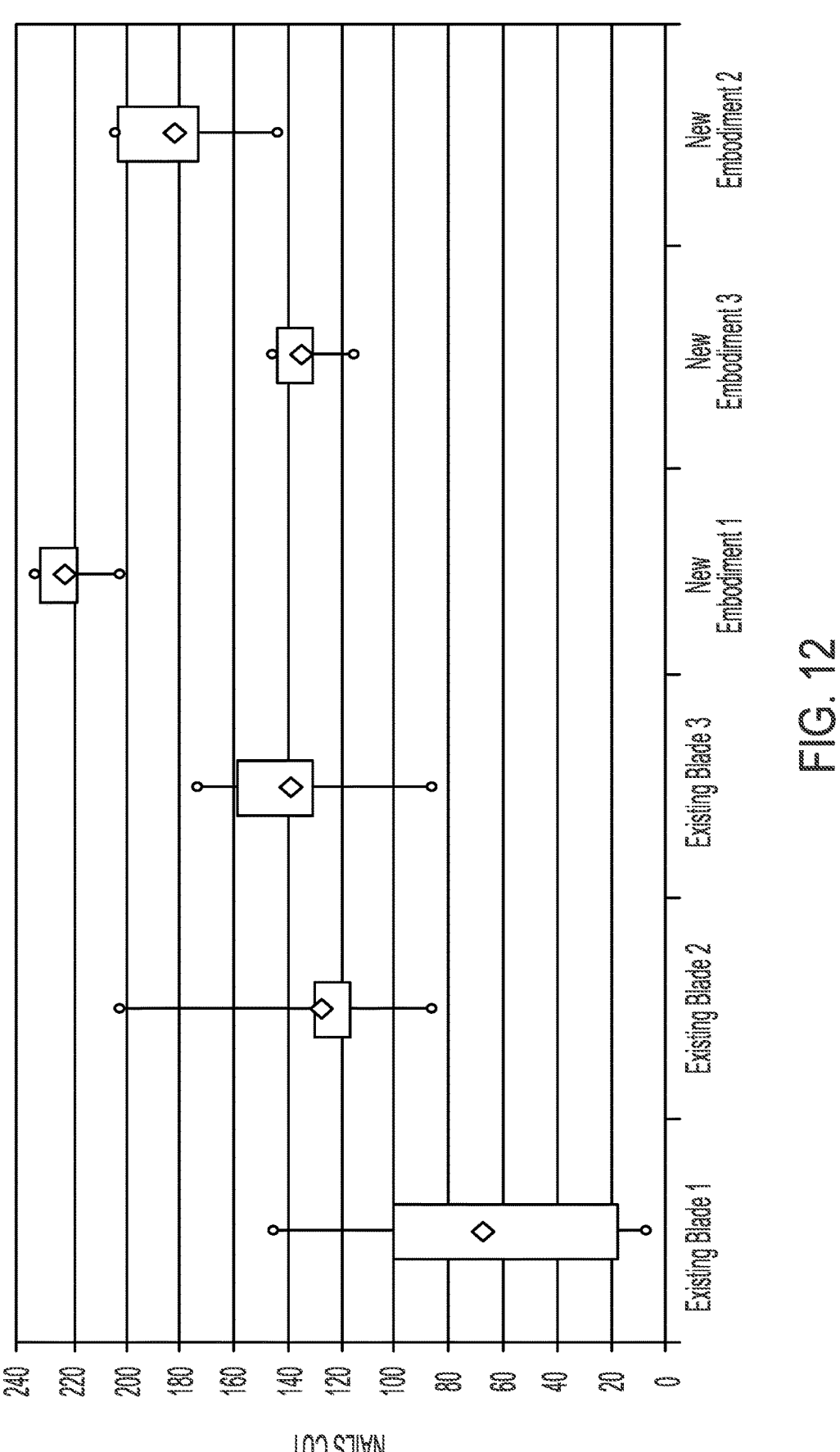
FIG. 12 is a chart illustrating results of durability tests of three embodiments of the saw blade of FIG. 4 in nail embedded wood.

Referring to FIG. 12, samples of circular saw blades according to Embodiments 1, 2, and 3 described above were compared to the same three leading circular saw blades in a durability test in nail embedded wood. This test was performed in 1½ inch thick pine embedded with 0.131 inch diameter stainless steel nails to determine the number of nails cut until the blade fails, with a higher number indicating greater durability. As shown in FIG. 12, three existing circular saw blades cut an average of approximately 65 nails, 125 nails, and 140 nails, respectively. The saw blade of Embodiment 1 cut an average of approximately 225 nails (an improvement of approximately 61% to approximately 246%). The saw blade of Embodiment 2 cut an average of approximately 140 nails (an improvement of approximately 0% to approximately 115%). The saw blade of Embodiment 3 cut an average of approximately 180 nails (an improvement of approximately 28% to approximately 180%). Thus, each of the embodiments of the saw blade of FIG. 4 demonstrated dramatic improvements in durability.

Figure 13:
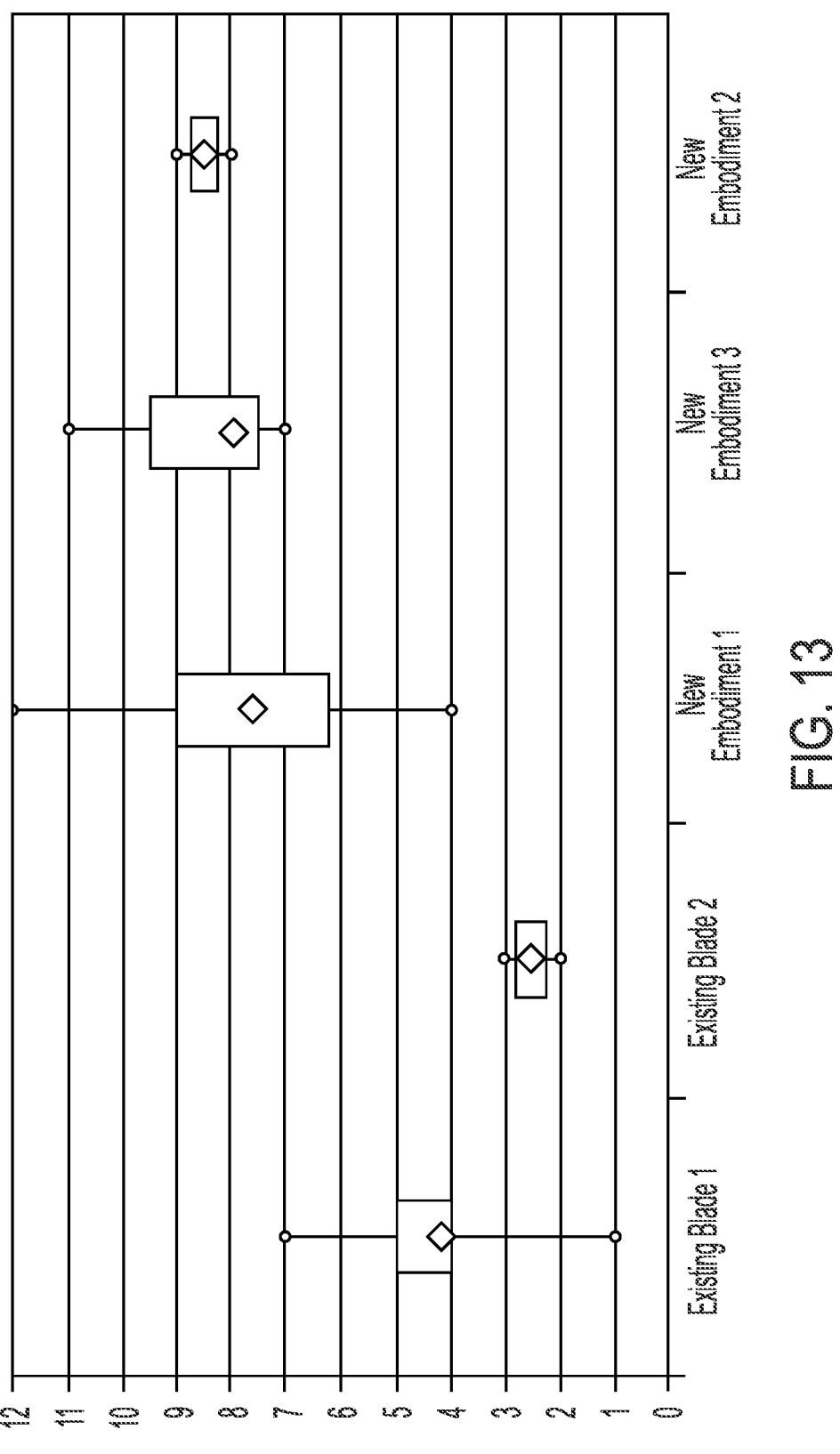
FIG. 13 is a chart illustrating results of durability tests of three embodiments of the saw blade of FIG. 4 in pine with lag bolts.
Figure 14:
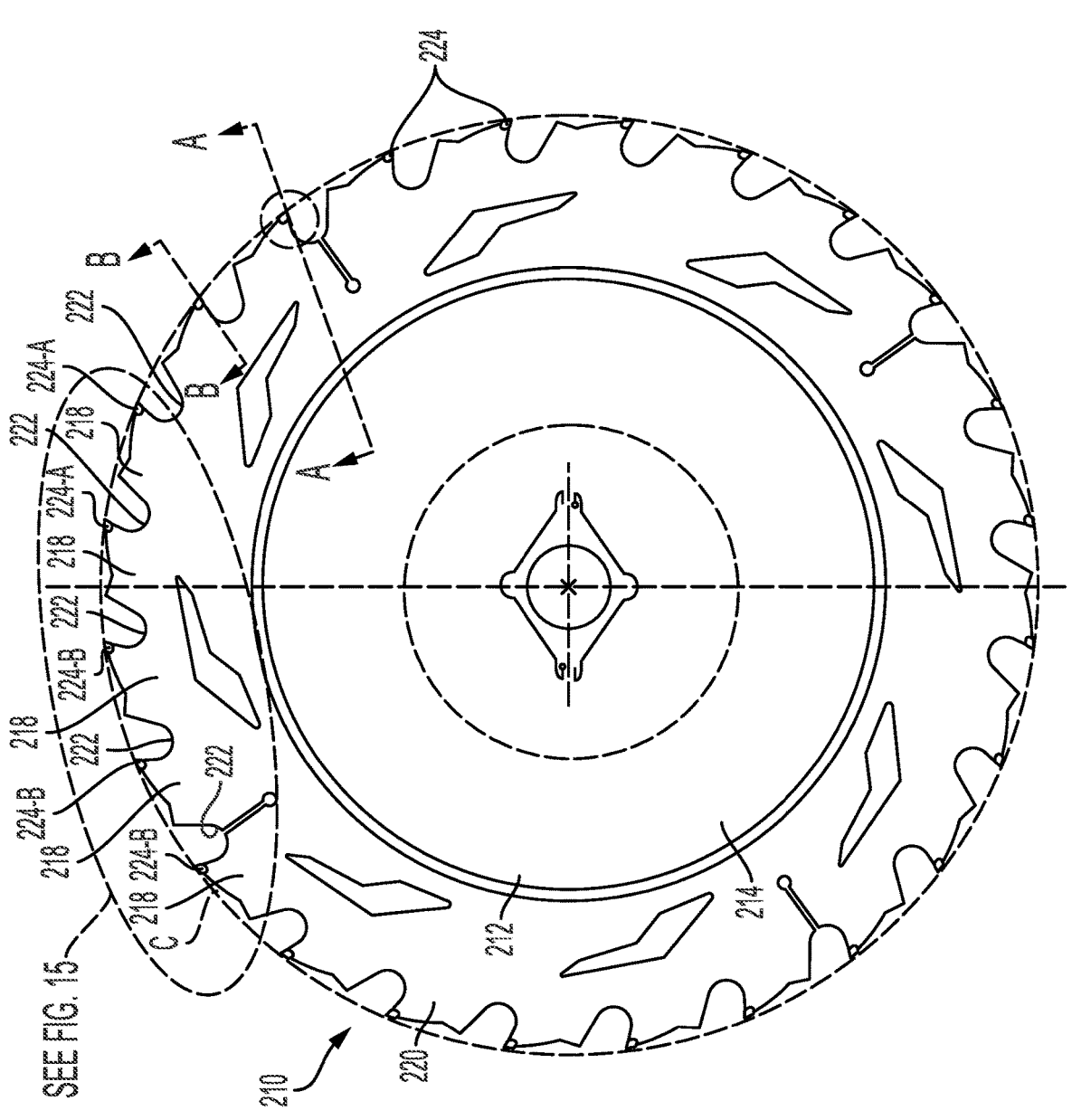
FIG. 14 is a side view of another embodiment of a circular saw blade according to this patent application.
Figure 15:
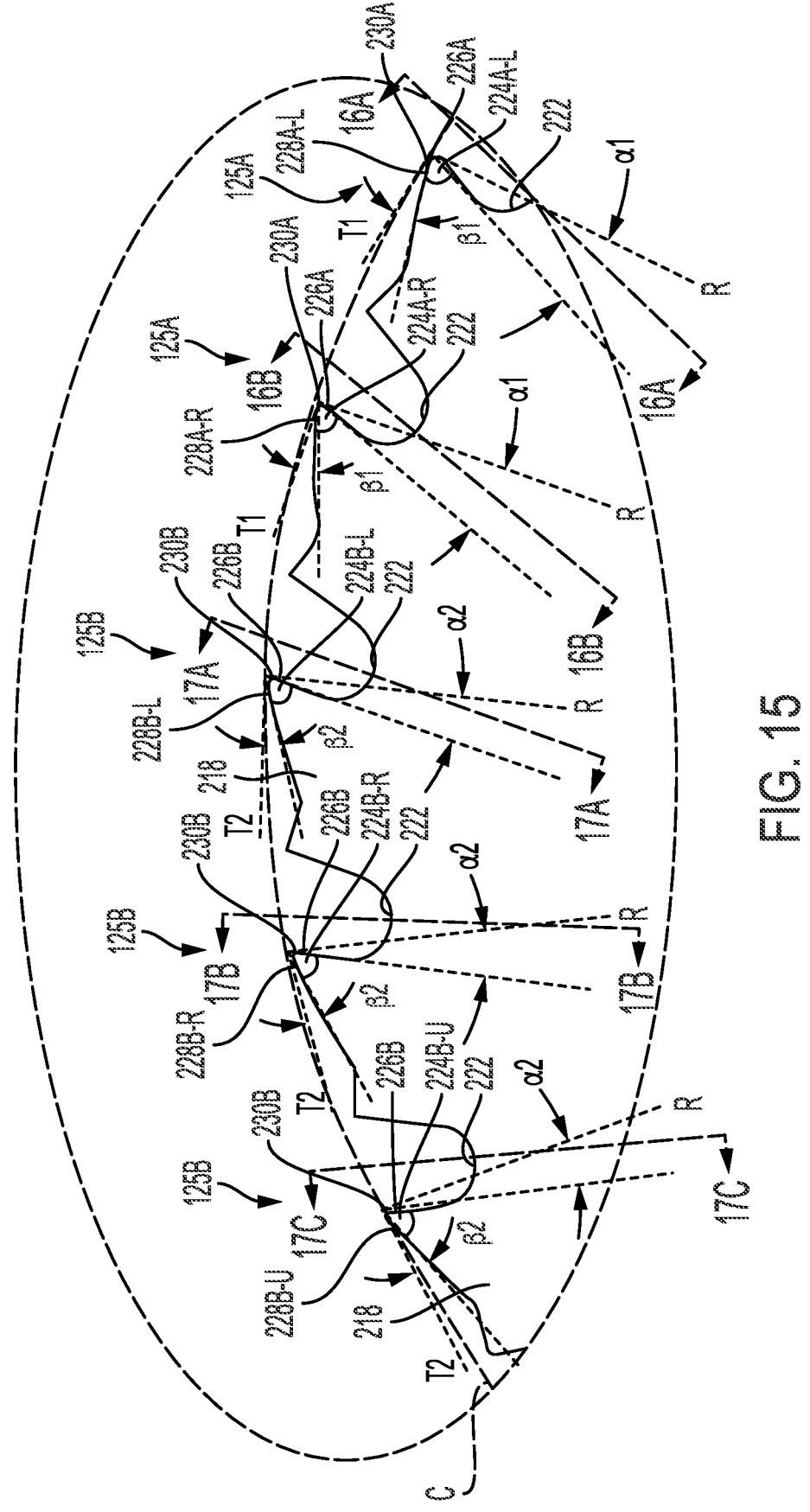
FIG. 15 is a close up view of a portion 202 of the saw blade of FIG. 14.
Figures 16A, 16B, 17A, 17B, 17C:
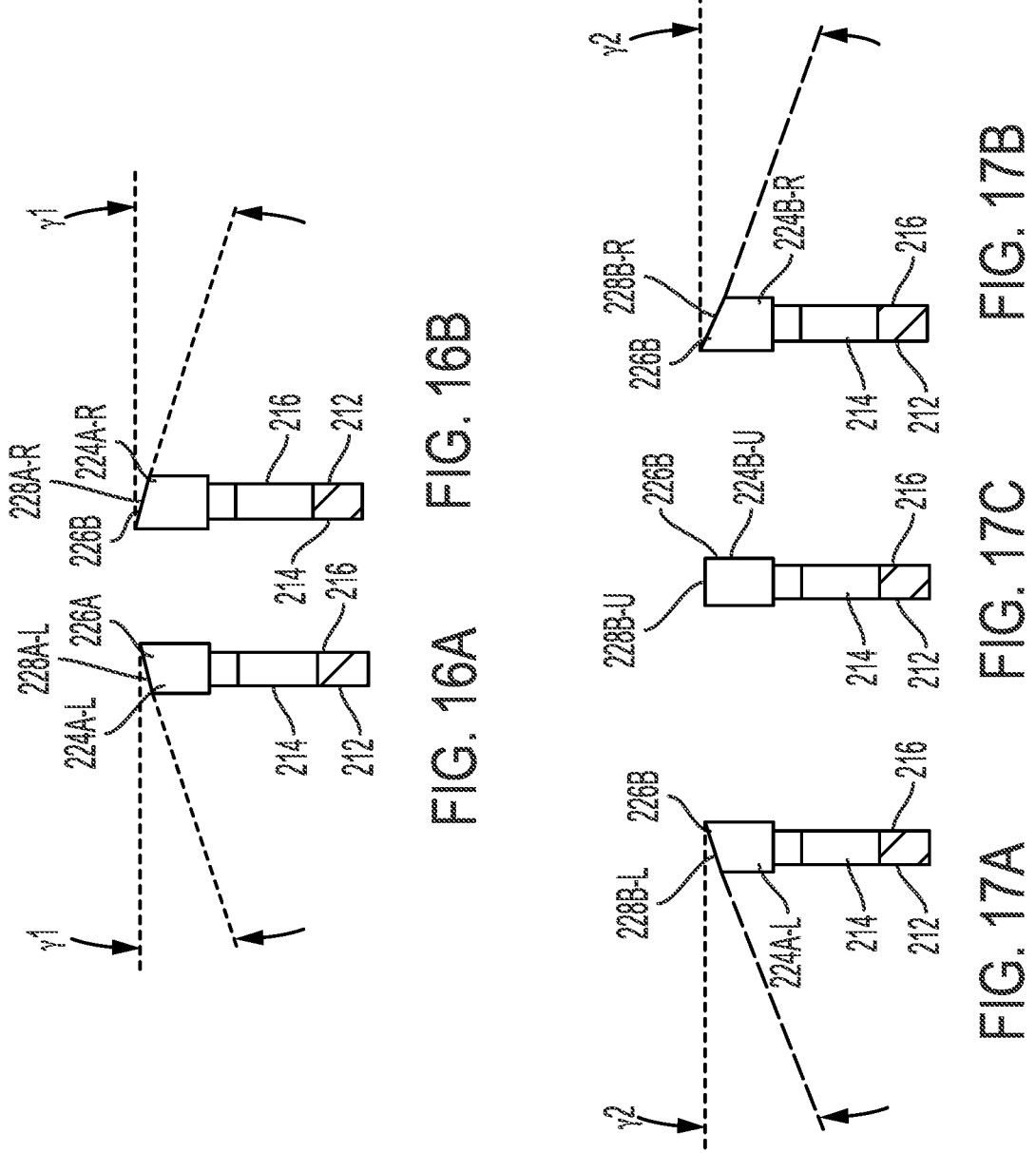
Figure 18:
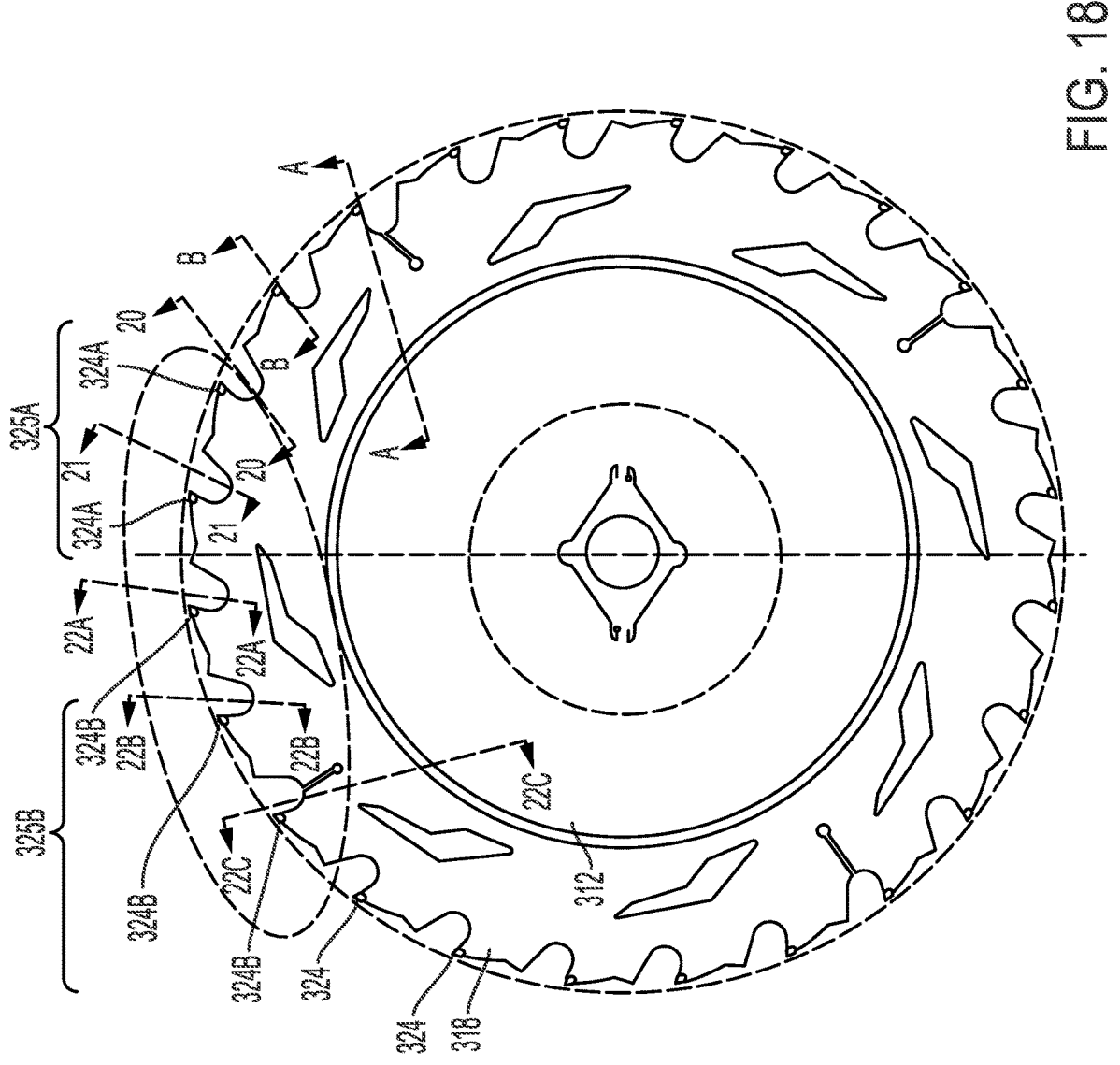
FIG. 18 is a side view of another embodiment of a circular saw blade according to this patent application.
Figure 19:
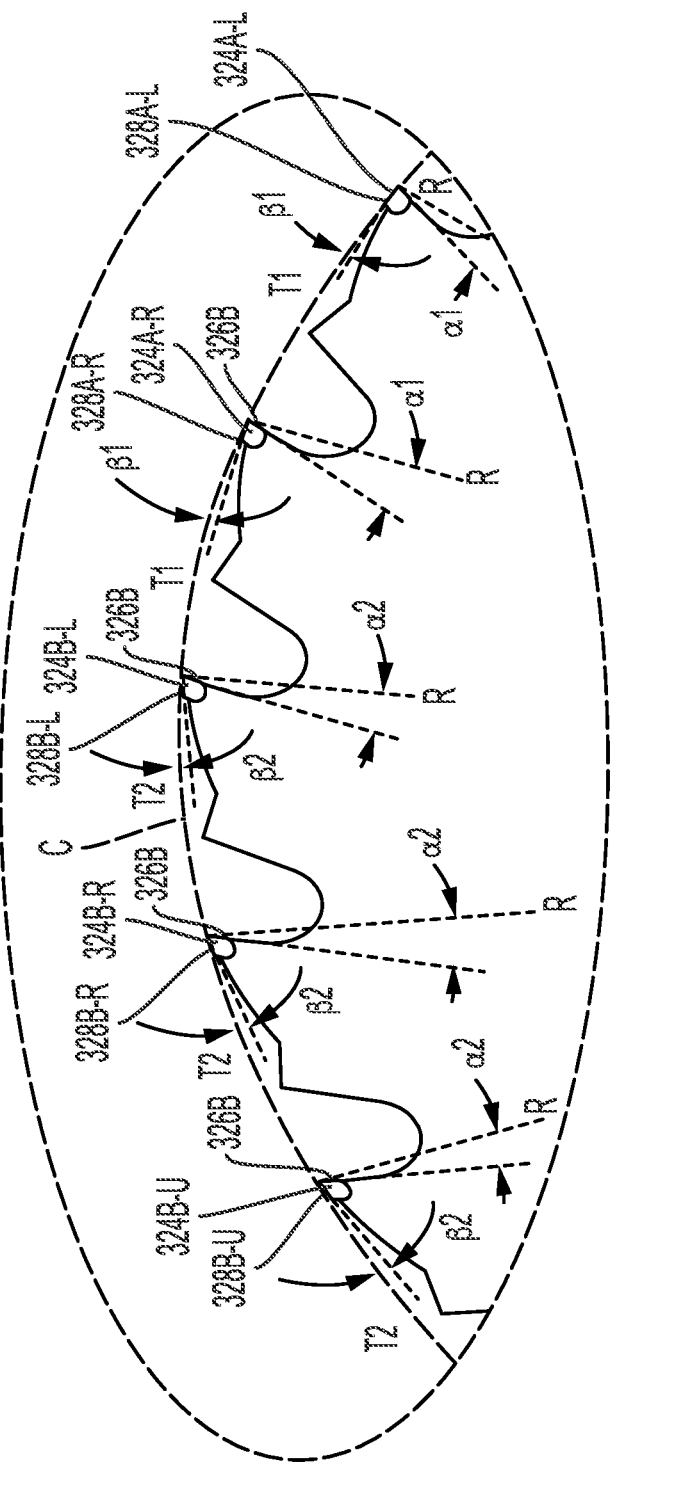
FIG. 19 is a close up view of a portion 302 of the saw blade of FIG. 18.
Figures 20, 21, 22A, 22B, 22C:
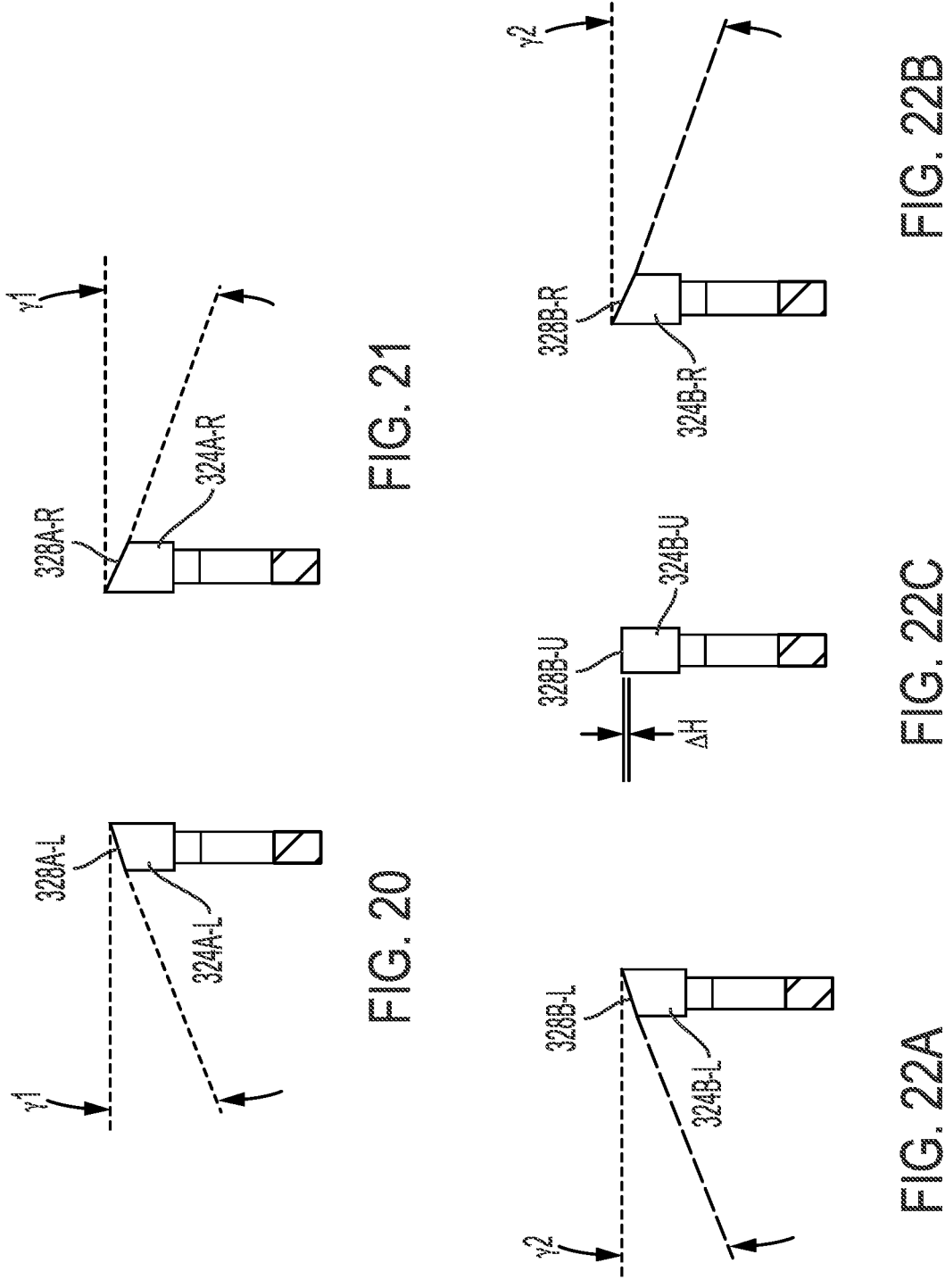
FIGS. 20 and 21 are cross-sectional views taken along lines 20-20 and 21-21 in FIG. 18.
FIGS. 22A, 22B, and 22C are cross-sectional views taken along lines 22A-22A, 22B-22B, and 22C-22C in FIG. 18.

Referring to FIG. 13, samples of circular saw blades according to Embodiments 1, 2, and 3 described above were compared to the three leading circular saw blades in a durability test in 1½ inch thick by 30 inch-long pieces of pine embedded with ¼" lag bolts. The saw blades were used to cut the workpiece until it took more than 20 seconds to make a cut, with a higher number of complete cuts indicating greater durability. As shown in FIG. 13, the three existing circular saw blades completed an average of approximately 4 cuts, 2.5 cuts, and 3 cuts, respectively. The saw blade of Embodiment 1 completed an average of approximately 7.5 cuts (an improvement of approximately 88% to approximately 200%). The saw blade of Embodiment 2 completed an average of approximately 8 cuts (an improvement of approximately 100% to approximately 220%). The saw blade of Embodiment 3 completed an average of approximately 8.5 cuts (an improvement of approximately 112% to approximately 240%). Thus, this test further demonstrates that each of the embodiments of FIG. 4 exhibited dramatic improvements in durability.

Referring to FIGS. 14-17C, in another embodiment, a circular saw blade 210 includes a generally circular blade body 212 having a first side face 214 and an opposite second side face 216. A plurality of cutting tooth holders 218 are coupled to a periphery 220 of the blade body 212. Around the periphery 220 are a plurality of gullets 222, each disposed between two adjacent cutting tooth holders 218. Each cutting tooth holder 218 supports one of a plurality of cutting teeth 224. Each tooth 224 may be generally prismatic in shape. The cutting teeth 224 alternate between first sets of cutting teeth 225A and second sets of cutting teeth 225B around the periphery of the blade body. The saw blade 210 differs from the saw blade 110 in that each second set of cutting teeth 225B additionally includes a robust tooth 224B-U that is an unbeveled or raker tooth.

Each first set of cutting teeth 225A comprises at least two (e.g., a pair) of efficient cutting teeth 224A. Each efficient cutting tooth 224A has a first rake face 226A disposed at a first rake angle $\alpha 1$ relative to a radius R of the blade body and a first relief face 228A disposed at a first relief angle $\beta 1$ relative a line T1 tangent to a circumference C of the saw blade 210. In addition, the first cutting teeth 224A alternate between a left beveled cutting tooth 224A-L with a left top beveled relief face 228A-L and a right beveled cutting tooth 224A-R with a right top beveled relief face 228A-R in an alternating top bevel (ATB) pattern. The relief faces 228A-L and 228B-R are beveled at a first top bevel angle $\gamma 1$.

Each second set of cutting teeth 225B comprises at least three (e.g., three) robust cutting teeth 224B. Each robust cutting tooth 224B has a first rake face 226B disposed at a second rake angle $\alpha 2$ relative to a radius R of the blade body and a second relief face 228B disposed at a second relief angle $\beta 2$ relative a line T2 tangent to the circumference C of the saw blade 210. In addition, the second teeth 224B include a left beveled tooth 224B-L with a left top beveled relief face 228B-L, a right beveled tooth 224B-R with a right top beveled relief face 228B-R, and the unbeveled (or raker) tooth 224B-U with an unbeveled relief face 228B-U, arranged in an alternating top bevel+raker (ATB+R) pattern. The left and right top beveled relief faces 228B-L and 228B-R are beveled at a second top bevel angle $\gamma 2$.

At least two out of the following three conditions are satisfied: (a) each second bevel angle $\gamma 2$ is less than each first bevel angle $\gamma 1$; (b) each second rake angle $\alpha 2$ is less than each first rake angle $\alpha 1$, and (c) each second relief angle $\beta 2$ is less than each first relief angle $\beta 1$. For example, at least two of the following three conditions may be satisfied: (a) each first top bevel angle $\gamma 1$ may be from approximately 16° to approximately 22° (e.g., approximately 18°) and each second top bevel angle $\gamma 2$ may be from approximately 8° to approximately 14° (e.g., approximately 13°); (b) each first rake angle $\alpha 1$ may be from approximately 16° to approximately 22° (e.g., approximately 20°), and each second rake angle $\alpha 2$ may be from approximately 8° to approximately 16° (e.g., approximately 12°); and (c) each first relief angle $\beta 1$ may be from approximately 16° to approximately 20° (e.g., approximately 16°) and each second rake angle $\beta 2$ may be from approximately 8° to approximately 14° (e.g., approximately) 10°. Note that in other embodiments, all three of these conditions may be satisfied.

If only two of the aforementioned three conditions are satisfied, then one of the following additional conditions also may be satisfied: (a) each second bevel angle $\gamma 2$ may be approximately equal to the first bevel angle $\gamma 1$; (b) each second rake angle $\alpha 2$ may be approximately equal to each first rake angle $\alpha 1$; and (c) each second relief angle $\beta 2$ may be approximately equal to each first relief angle $\beta 1$. For example, one of the following three conditions may be satisfied: (a) each first top bevel angle $\gamma 1$ may be from approximately 8° to approximately 22° (e.g., approximately 16°); (b) each first rake angle α1 and each second rake angle α2 may be from approximately 8° to approximately 22° (e.g., approximately 15°); and (c) each first relief angle β1 and each second rake angle β2 may be from approximately 8° to approximately 20° (e.g., approximately 16°). The addition of the unbeveled robust tooth 224B-U helps further reduce the impact force on all teeth in the first and second sets, which further improves the durability of the saw blade.

Referring to FIGS. 18-22C, in another embodiment, a circular saw blade 310 includes a generally circular blade body 312, a plurality of cutting tooth holders 318 coupled to a periphery of the blade body 312, and a plurality of cutting teeth 324 supported by the tooth holders 318, similar to the blade body 212, tooth holders 218, and cutting teeth 224 of the saw blade 210 of FIGS. 14-17C. Each tooth 324 may be generally prismatic in shape. Like the saw blade 210, the cutting teeth 324 of saw blade 310 alternate between first sets of cutting teeth 325A and second sets of cutting teeth 325B around the periphery of the blade body.

Each first set of cutting teeth 325A comprises at least two (e.g., a pair) of efficient cutting teeth 324A. Each efficient cutting tooth 324A has a first rake face 326A disposed at a first rake angle α1 relative to a radius R of the blade body and a first relief face 328A disposed at a first relief angle β1 relative a line T1 tangent to a circumference C of the blade body 312. In addition, the first cutting teeth 324A alternate between a left beveled cutting tooth 324A-L with a left top beveled relief face 328A-L and a right beveled cutting tooth 324A-R with a right top beveled relief face 328A-R in an alternating top bevel (ATB) pattern. The relief faces 328A-L and 328B-R are beveled at a first top bevel angle γ1.

Each second set of cutting teeth 325B comprises at least three (e.g., three) robust cutting teeth 324B. Each robust cutting tooth 324B has a first rake face 326B disposed at a second rake angle α2 relative to a radius R of the blade body and a second relief face 328B disposed at a second relief angle β2 relative a line T2 tangent to the circumference C of the saw blade 210. In addition, the second teeth 324B include a left beveled tooth 324B-L with a left top beveled relief face 328B-L, a right beveled tooth 324B-R with a right top beveled relief face 328B-R, and the unbeveled (or raker) tooth 324B-U with an unbeveled relief face 328B-U, arranged in an alternating top bevel+raker (ATB+R) pattern. The left and right top beveled relief faces 328B-L and 328B-R are beveled at a second top bevel angle γ2.

At least two out of the following three conditions are satisfied: (a) each second bevel angle γ2 is less than each first bevel angle γ1; (b) each second rake angle α2 is less than each first rake angle α1, and (c) each second relief angle β2 is less than each first relief angle β1. For example, at least two of the following three conditions may be satisfied: (a) each first top bevel angle γ1 may be from approximately 16° to approximately 22° (e.g., approximately 18°) and each second top bevel angle γ2 may be from approximately 8° to approximately 14° (e.g., approximately 13°); (b) each first rake angle α1 may be from approximately 16° to approximately 22° (e.g., approximately 20°), and each second rake angle α2 may be from approximately 8° to approximately 16° (e.g., approximately 12°); and (c) each first relief angle β1 may be from approximately 16° to approximately 20° (e.g., approximately 16°) and each second rake angle β2 may be from approximately 8° to approximately 14° (e.g., approximately) 10°. Note that in other embodiments, all three of these conditions may be satisfied.

If only two of the aforementioned three conditions are satisfied, then one of the following three conditions also may be satisfied: (a) each second bevel angle γ2 may be approximately equal to the first bevel angle γ1; (b) each second rake angle α2 may be approximately equal to each first rake angle α1; and (c) each second relief angle β2 may be approximately equal to each first relief angle β1. For example, one of the following three conditions may be satisfied: (a) each first top bevel angle γ1 may be from approximately 8° to approximately 22° (e.g., approximately 16°); (b) each first rake angle α1 and each second rake angle α2 may be from approximately 8° to approximately 22° (e.g., approximately 15°); and (c) each first relief angle β1 and each second rake angle β2 may be from approximately 8° to approximately 20° (e.g., approximately 16°).

The saw blade 320 differs from the saw blade 220 in that the unbeveled robust tooth 324B-U is lowered by height ΔH1 (e.g., approximately 0.03 mm to approximately 0.075 mm) from the saw circumference C. The lower height of unbeveled robust tooth 324B-U reduces the chip load on unbeveled robust tooth 324B-U and helps balance the chip load between the top beveled robust teeth 324B-R and 324B-L. For example, lowering the height on the unbeveled robust tooth 324B-U may reduce the chip load on that tooth as compared to the chip load on the unbeveled robust tooth 324B-U being approximately twice the chip thickness as that of the top beveled robust teeth 324B-R and 324B-L without the height reduction. In other embodiments, the unbeveled robust tooth may have a top face with shapes other than the flat top face shown in FIG. 22C, while still achieving the benefits of reduced chip load described above.

Figures 23A, 23B:
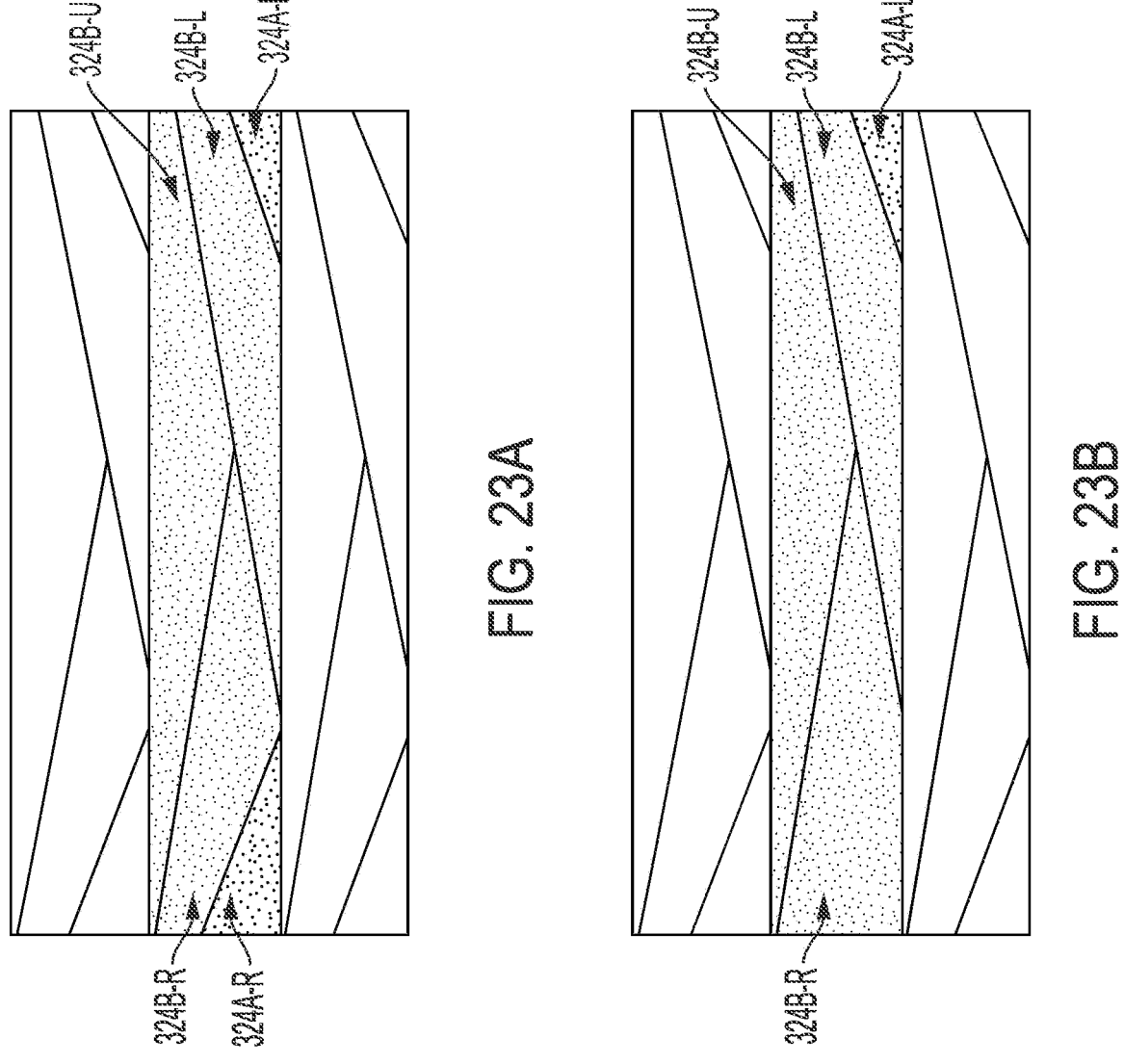
FIGS. 23A and 23B are schematic chip model diagrams of the cutting teeth of the saw blade of FIG. 18.
Figure 24:
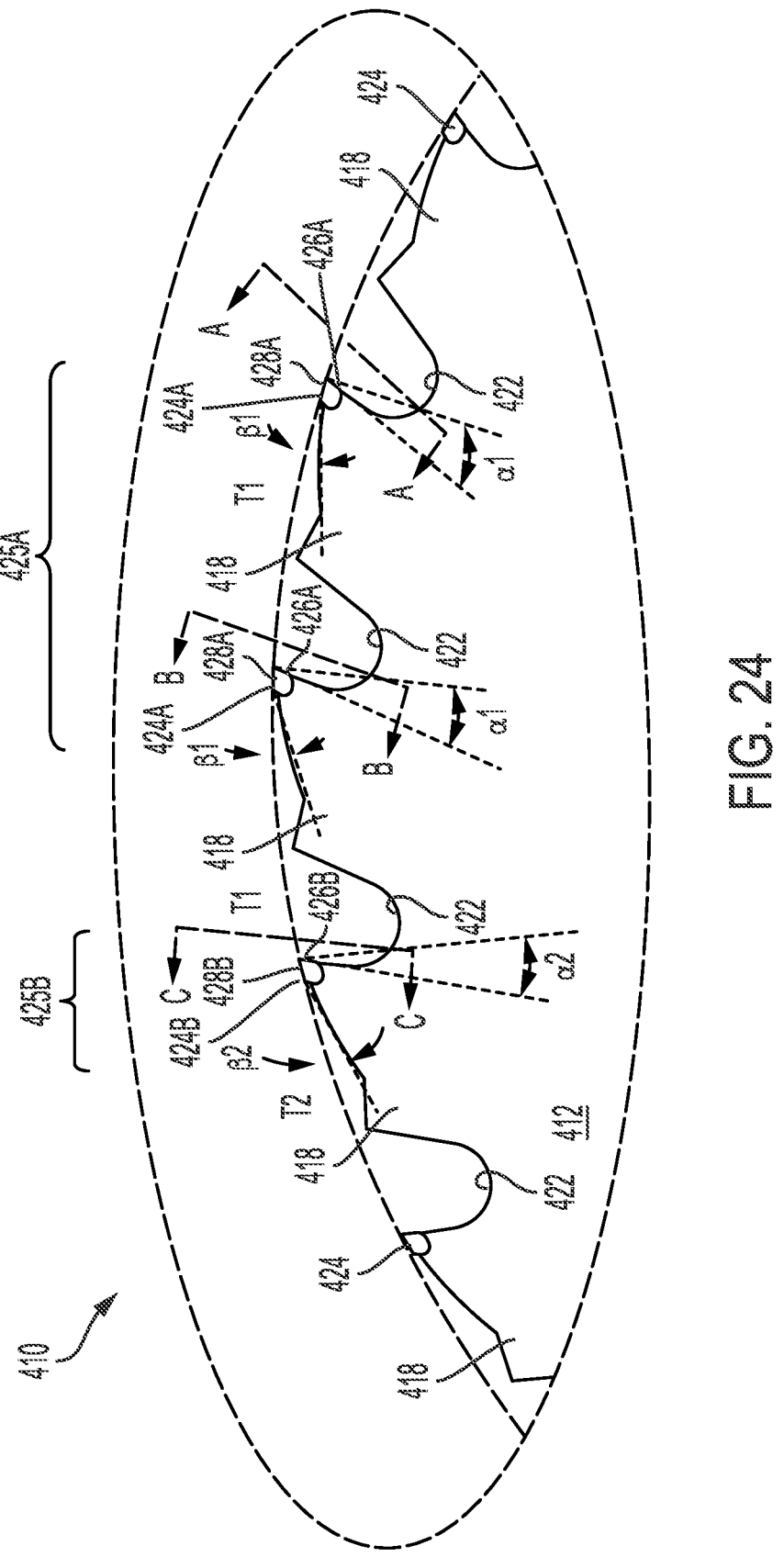
FIG. 24 is a close up view of a portion of another embodiment of a saw blade according to this patent application.

FIGS. 23A-23B schematically illustrate the exposed surface area and impact loads on the circular saw blade shown in FIGS. 19-22C. As shown in FIG. 23A, initially, prior to any tooth breakage, the total exposed surface area of the efficient teeth 324A-L, 324A-R is less than the total exposed surface area of the robust teeth 324B-L, 324B-R, 324B-U. This is purposeful because the robust teeth are more able to withstand impact loading. For example, in an embodiment of such a saw blade with a 1.6 mm kerf and a chip thickness of approximately 0.05 mm, the exposed surface areas of the right and left top beveled efficient teeth 324A-R, 324A-L may be approximately 0.031 mm$^2$ and 0.014 mm$^2$, respectively, while the exposed surface area of the right top beveled, left top beveled, and unbeveled robust teeth 324B-R, 324B-L, 324B-U are approximately 0.106 mm$^2$, 0.100 mm$^2$, and 0.149 mm$^2$, respectively. Thus, the efficient teeth 324A and robust teeth 324B receive approximately 11% and 89% of the impact load, respectively.

As shown in FIG. 23B, if one of the efficient teeth breaks, the exposed surface area of the robust teeth increases, but by a much smaller percentage than in existing saw blades. For example, if a right beveled efficient tooth 324A-R breaks, the exposed surface area of the following right beveled robust tooth 324B-R increases to approximately 0.137 mm$^2$, while the exposed surface area of the left beveled and unbeveled robust teeth 324B-L, 324B-U remain the same. Thus, the impact force on the right top beveled robust tooth 324B-R increases by only approximately 29%. This increased force is sufficiently low (e.g., less than a 45% increase) such that the robust tooth can handle the increased force, which inhibits cascading breakages of teeth around the periphery of the saw blade.

Referring to FIGS. 24-30B, in other embodiments, a circular saw blade 410 includes a generally circular blade body 412 having a first side face 414 and an opposite second side face 416. A plurality of cutting tooth holders 418 are coupled to a periphery 420 of the blade body 412. Around the periphery 420 are a plurality of gullets 422, each disposed between two adjacent cutting tooth holders 418.

Each cutting tooth holder 418 supports one of a plurality of cutting teeth 424. Each tooth 424 may be generally prismatic in shape. The cutting teeth 424 alternate between first sets of cutting teeth 425A and second sets of cutting teeth 425B around the periphery of the blade body.

Each first set of cutting teeth 425A comprises at least two (e.g., a pair) of efficient cutting teeth 424A. Each efficient cutting tooth 424A has a first rake face 426A disposed at a first rake angle α1 relative to a radius R of the blade body and a first relief face 428A disposed at a first relief angle β1 relative a line T1 tangent to a circumference C of the saw blade 410. In addition, the first cutting teeth 424A alternate between a left beveled cutting tooth 424A-L with a left top beveled relief face 428A-L and a right beveled cutting tooth 424A-R with a right top beveled relief face 428A-R in an alternating top bevel (ATB) pattern. The relief faces 428A-L and 428B-R are beveled at a first top bevel angle γ1.

Each second set of cutting teeth 425B comprises at least one (e.g., only one) robust cutting tooth 424B, each being a raker tooth (i.e., not having an alternating top bevel that alternates between left and right beveled relief faces). Each robust raker cutting tooth 424B has a first rake face 426B disposed at a second rake angle α2 relative to a radius R of the blade body and a second relief face 428B disposed at a second relief angle β2 relative a line T2 tangent to the circumference C of the saw blade 410. At least one out of the following two conditions are satisfied: (a) each second rake angle α2 is less than each first rake angle α1, and (b) each second relief angle β2 is less than each first relief angle β1. For example, at least one of the following two conditions may be satisfied: (a) each first rake angle α1 may be from approximately 17° to approximately 21° (e.g., approximately 20°), and each second rake angle α2 may be from approximately 12° to approximately 18° (e.g., approximately 16°); and (b) each first relief angle β1 may be from approximately 12° to approximately 18° (e.g., approximately) 16° and each second rake angle β2 may be from approximately 12° to approximately 17° (e.g., approximately 12°). Note that in other embodiments, both of these conditions may be satisfied. Also, in yet other embodiments, each second set of cutting teeth may include a plurality of the robust raker teeth.

Figures 25A, 25B, 25C:
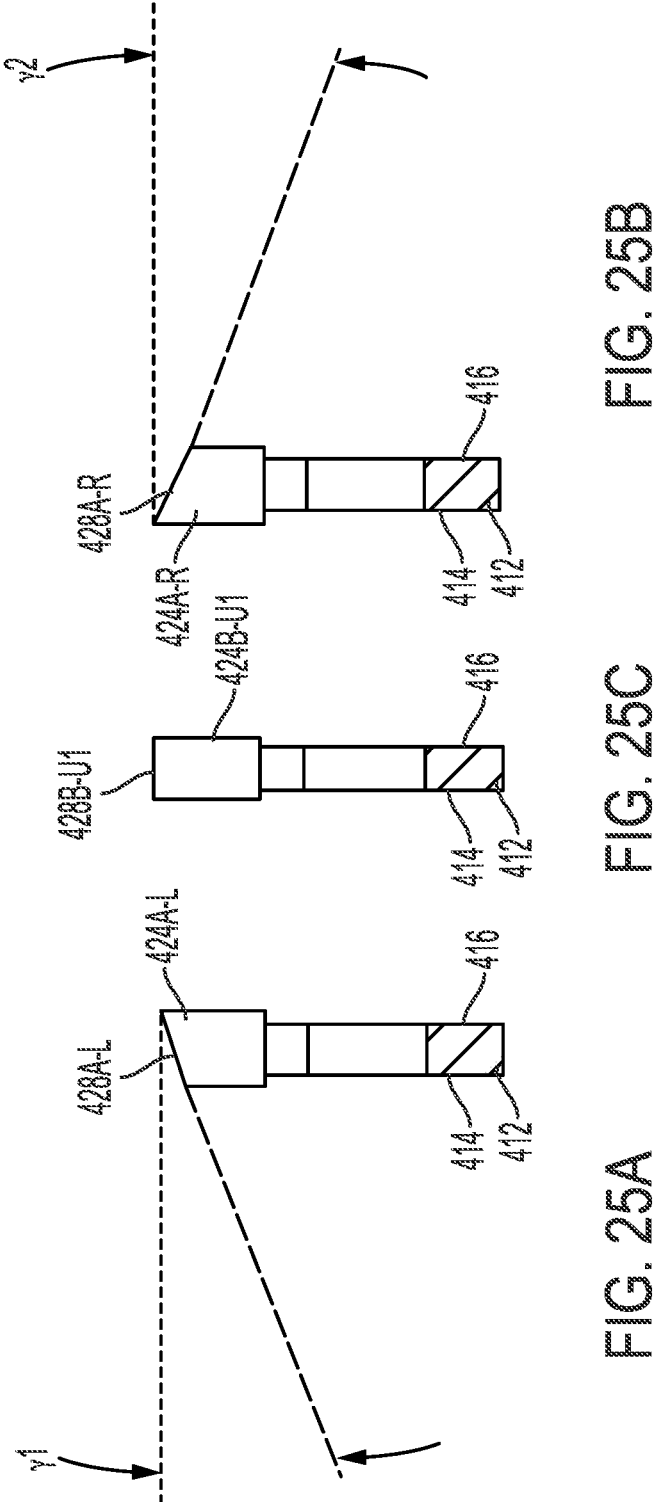
FIGS. 25A, 25B, and 25C are cross-sectional views of a first implementation of the saw blade of FIG. 24, taken along lines A-A, B-B, and C-C.
Figure 27B:
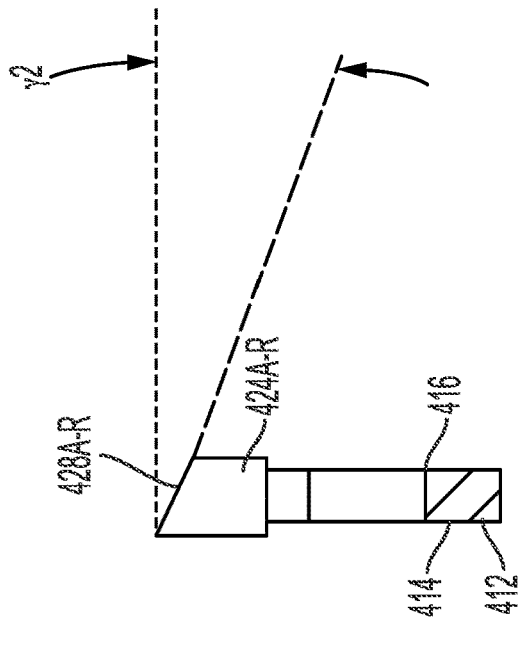
FIGS. 27A, 27B, and 27C are cross-sectional views of a second implementation of the saw blade of FIG. 24, taken along lines A-A, B-B, and C-C.
Figure 27C:
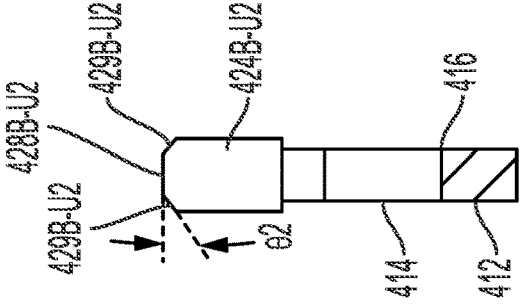
Figure 27A:
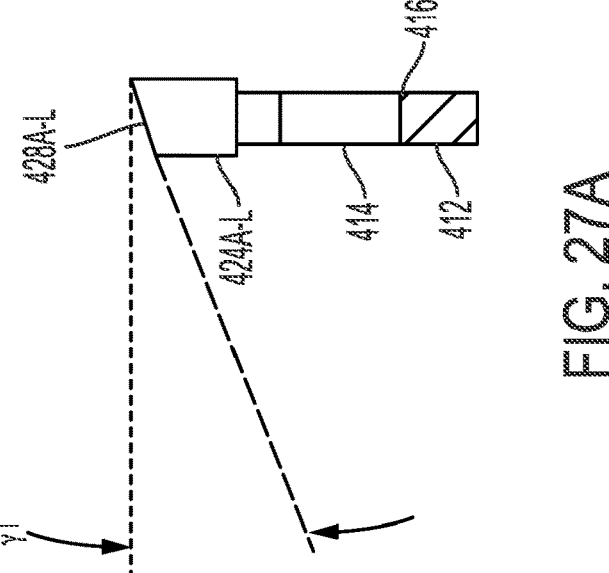
Figures 29A, 29B, 29C:
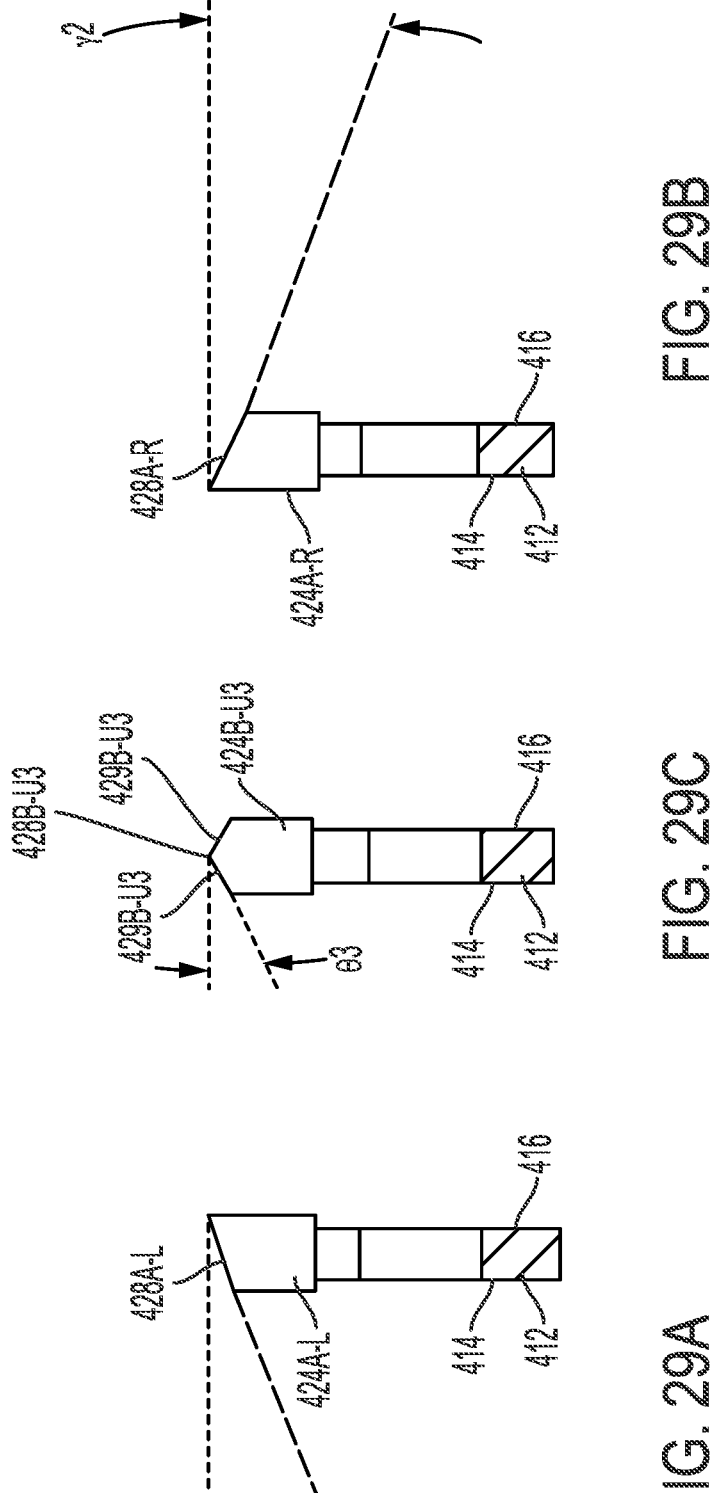
FIGS. 29A, 29B, and 29C are cross-sectional views of a third implementation of the saw blade of FIG. 24, taken along lines A-A, B-B, and C-C.

In a first implementation of this embodiment (as shown in FIGS. 25A-25C), each second tooth 424B is a raker tooth 424B-U1 with a flat, unbeveled top relief face 428B-U1. In a second implementation of this embodiment (as shown in FIGS. 27A-27C), each second tooth 424B is a raker tooth 424B-U2 with a flat, unbeveled top relief face 428B-U2 and beveled corner faces 429B-U2 beveled at a corner bevel angle θ2 (e.g., approximately 7° to approximately 25°). In a third implementation of this embodiment (as shown in FIGS. 29A-29C), each second tooth 424B is a raker tooth 424B-U3 with a roof shaped top relief face 428B-U3 with beveled faces 429B-U3 beveled at a roof bevel angle θ3 (e.g., approximately 6° to approximately 20°).

Figures 26A, 26B:
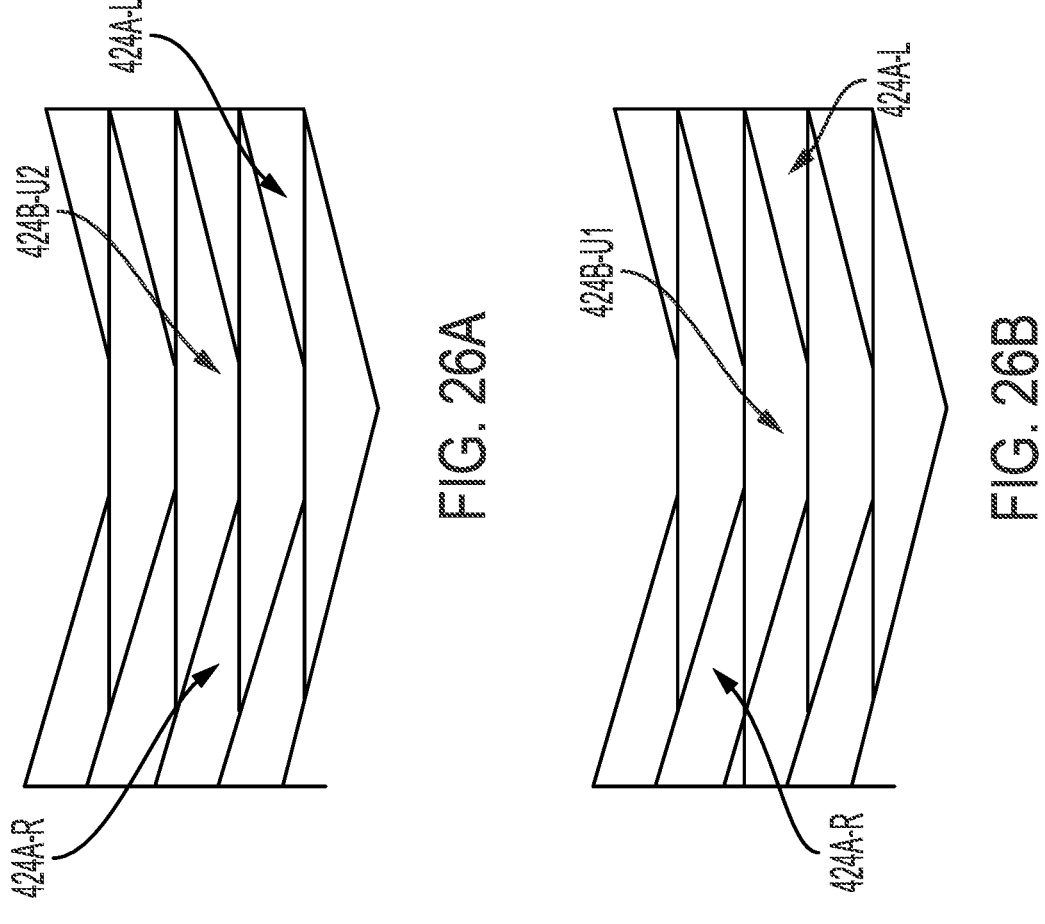
FIGS. 26A and 26B are schematic chip model diagrams of the cutting teeth of the saw blade of FIGS. 25A-25C.

FIGS. 26A and 26B schematically illustrate the exposed surface area and impact loads on the first implementation of this embodiment shown in FIGS. 25A-25C. As shown in FIG. 26A, initially, prior to any tooth breakage, the total exposed surface area of a pair of efficient teeth 424A-L, 324A-R is less than or equal to the total exposed surface area a following robust tooth 424B-U1. For example, in an embodiment of such a saw blade with a 1.6 mm kerf, a chip thickness of approximately 0.05 mm, and a raker tooth edge approximately 0.10 mm below the circumference formed by the tips of the efficient teeth, the exposed surface areas of each left and right top beveled efficient teeth 424A-L,

424A-R may be approximately 0.063 mm² and 0.045 mm², respectively, while the exposed surface area of each raker robust tooth 324B-U1 is approximately 0.113 mm². Thus, the efficient teeth 424A and robust teeth 424B receive approximately 45% and 55% of the impact load, respectively.

As shown in FIG. 26B, if one of the efficient teeth breaks, the exposed surface area of the following robust tooth 424B-U1 increases, but by a much smaller percentage than in existing saw blades. For example, if a left beveled efficient tooth 424A-L breaks, the exposed surface area of following raker robust tooth 424B-U1 increases to 0.190 mm², i.e., an increase of only approximately 45%. This increased force is sufficiently low (e.g., an approximately 45% increase) such that the robust tooth can handle the increased force, which inhibits cascading breakages of teeth around the periphery of the saw blade.

Figures 28A, 28B:
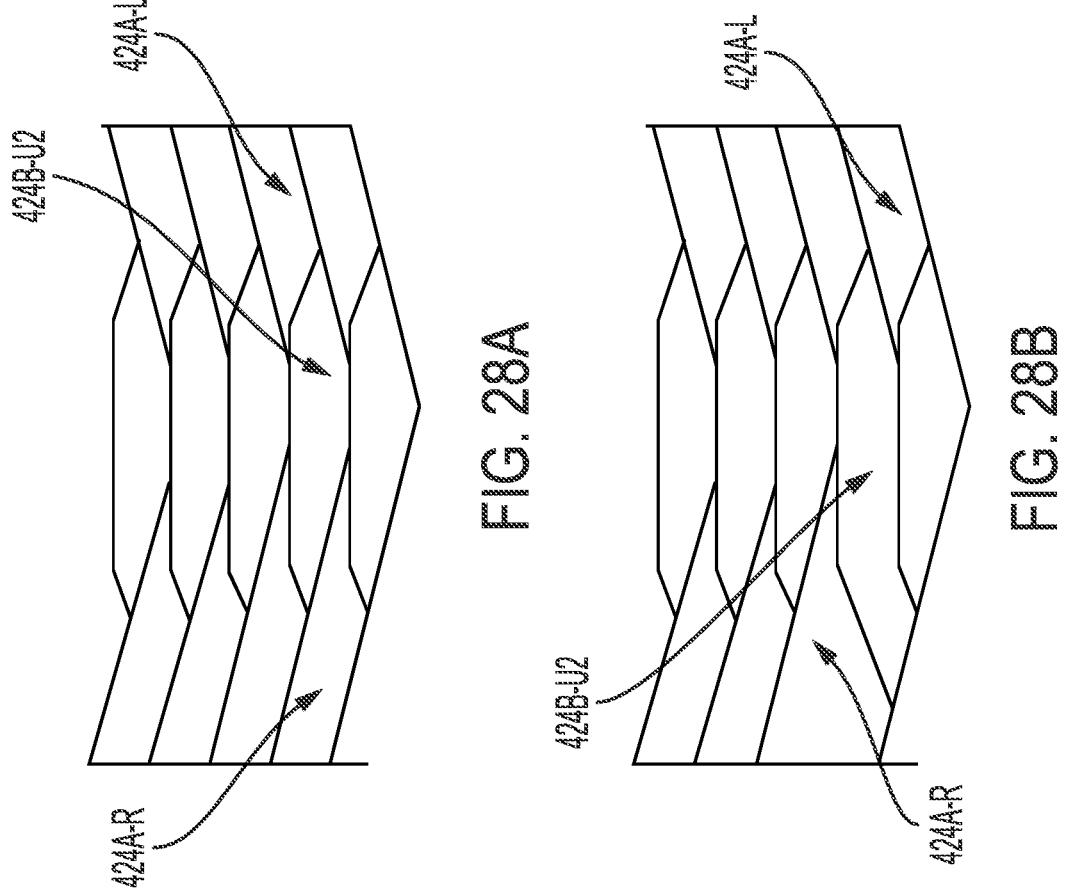
FIGS. 28A and 28B are schematic chip model diagrams of the cutting teeth of the saw blade of FIGS. 27A-27C.

FIGS. 28A and 28B schematically illustrate the exposed surface area and impact loads on the second implementation of this embodiment shown in FIGS. 27A-27C. As shown in FIG. 28A, initially, prior to any tooth breakage, the total exposed surface area of a pair of efficient teeth 424A-L, 324A-R is greater than or equal to the total exposed surface area a following robust tooth 424B-U2. For example, in an embodiment of such a saw blade with a 1.6 mm kerf and a chip thickness of approximately 0.05 mm, the exposed surface areas of each left and right top beveled efficient teeth 424A-L, 424A-R may be approximately 0.064 mm² and 0.073 mm², respectively, while the exposed surface area of each raker robust tooth 324B-U1 is approximately 0.095 mm². Thus, the efficient teeth 424A and robust teeth 424B receive approximately 59% and 41% of the impact load, respectively.

As shown in FIG. 28B, if one of the efficient teeth breaks, the exposed surface area of the following robust tooth 424B-U2 increases, but by a much smaller percentage than in existing saw blades. For example, if a right beveled efficient tooth 424A-R breaks, the exposed surface area of following raker robust tooth 424B-U2 increases to 0.135, i.e., an increase of only approximately 42%. This increased force is sufficiently low (e.g., also approximately 42% increase) such that the robust tooth can handle the increased force, which inhibits cascading breakages of teeth around the periphery of the saw blade.

Figure 30A:
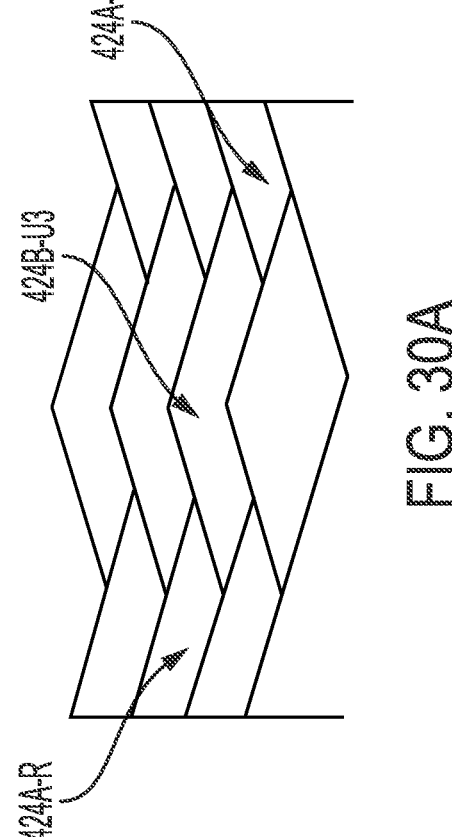
FIGS. 30A and 30B are schematic chip model diagrams of the cutting teeth of the saw blade of FIGS. 29A-29C.
Figure 30B:
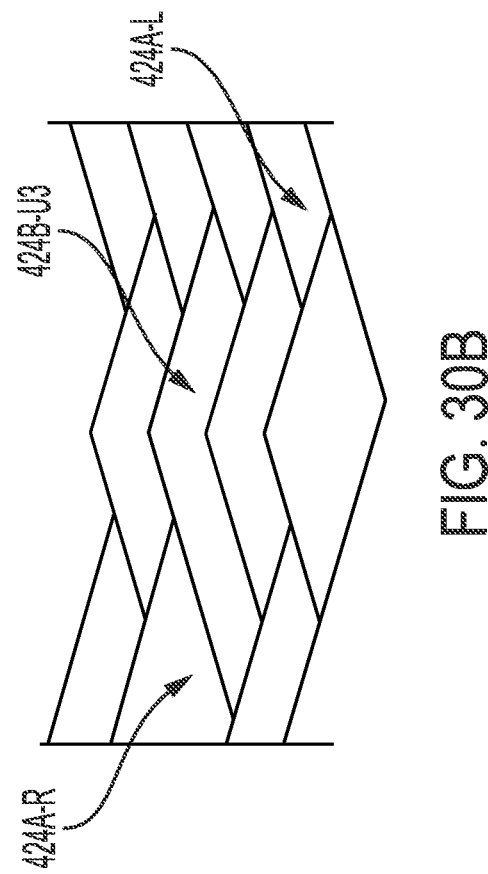

FIGS. 30A and 30B schematically illustrate the exposed surface area and impact loads on the first implementation of this embodiment shown in FIGS. 29A-299C. As shown in FIG. 30A, initially, prior to any tooth breakage, the total exposed surface area of a pair of efficient teeth 424A-L, 324A-R is approximately equal to the total exposed surface area a following robust tooth 424B-U1. For example, in an embodiment of such a saw blade with a 1.6 mm kerf and a chip thickness of approximately 0.05 mm, the exposed surface areas of each left and right top beveled efficient teeth 424A-L, 424A-R may be approximately 0.054 mm² and 0.066 mm², respectively, while the exposed surface area of each raker robust tooth 324B-U3 is approximately 0.120 mm². Thus, the efficient teeth 424A and robust teeth 424B each receive approximately 50% of the impact load, respectively.

As shown in FIG. 30B, if one of the efficient teeth breaks, the exposed surface area of the following robust tooth 424B-U3 increases, but by a much smaller percentage than in existing saw blades. For example, if a right beveled efficient tooth 424A-R breaks, the exposed surface area of following raker robust tooth 424B-U3 increases to 0.158, i.e., an increase of approximately 32%. This increased force is sufficiently low (e.g., also approximately 32% increase) such that the robust tooth can handle the increased force, which inhibits cascading breakages of teeth around the periphery of the saw blade.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of the following claims.

What is claimed is:

1. A circular saw blade comprising:
a generally circular blade body having a first side face and an opposite second side face;
a plurality of tooth holders coupled to a periphery of the blade body;
a plurality of gullets, each gullet disposed between two adjacent cutting tooth holders;
a plurality of teeth, each tooth supported by one of the tooth holders and having a rake face facing toward an adjacent gullet and extending transverse to the first and second side faces, a relief face extending from the rake face toward the tooth holder that is supporting the cutting tooth and extending transverse to the first and second side faces, and a cutting edge at a junction between the rake face and a relief face and extending transverse to the first and second side faces,
wherein the plurality of teeth sequentially alternate between a first set of cutting teeth and a second set of cutting teeth around the periphery of the blade body,
wherein the first set of cutting teeth have relief faces beveled toward one of the first side face and the second side face in an alternating top bevel pattern at a first top bevel angle, the rake face disposed at a first rake angle relative to a radius of the blade body, and the relief face disposed at a first relief angle relative a line tangent to the periphery of the blade body, wherein the second set of cutting teeth have relief faces beveled toward one of the first side face and the second side face in an alternating top bevel pattern at a second top bevel angle, the rake face disposed at a second rake angle relative to a radius of the blade body, and the relief face disposed at a second relief angle relative a line tangent to the periphery of the blade body,
wherein at least two out of the following three conditions are satisfied: (a) the second bevel angle is less than the first bevel angle; (b) the second rake angle is less than the first rake angle, and (c) the second relief angle is less than the first relief angle, and
wherein the first set of cutting teeth and the second set of cutting teeth are configured so that the second set of cutting teeth receive a greater percentage of a total chip load on the plurality of teeth than the first set of cutting teeth.

2. The circular saw blade of claim 1, wherein only two of the three conditions are satisfied, and one of the following additional conditions is also satisfied: (a) each second bevel angle is approximately equal to the first bevel angle; (b) each second rake angle is approximately equal to each first rake angle; and (c) each second relief angle is approximately equal to each first relief angle.

3. The circular saw blade of claim 1, wherein all of the three conditions are satisfied.

4. The circular saw blade of claim 1, wherein each second bevel angle is less than each first bevel angle, each second rake angle is less than each first rake angle, and each second relief angle is approximately equal to each first relief angle.

5. The circular saw blade of claim 1, wherein each second bevel angle is approximately equal to each first bevel angle, each second rake angle is less than each first rake angle, and each second relief angle is less than each first relief angle.

6. The circular saw blade of claim 1, wherein each second bevel angle is less than each first bevel angle, each second rake angle is approximately equal to each first rake angle, and each second relief angle is less than each first relief angle.

7. The circular saw blade of claim 1, wherein each tooth comprises a cutting insert composed of a harder material than the blade body.

8. The circular saw blade of claim 1, wherein the second set of cutting teeth further includes a raker tooth, each raker tooth having a relief face that is symmetrical relative to the first side face and the second side face.

9. The circular saw blade of claim 8, wherein the relief face of the raker tooth is at least partially unbeveled.

10. The circular saw blade of claim 8, wherein the relief face of the raker tooth is beveled symmetrically toward the first side face and toward the second side face.

11. The circular saw blade of claim 8, wherein, during cutting, raker tooth has an exposed surface area that is greater than an exposed surface area of each of the first set of cutting teeth.

12. The circular saw blade of claim 1, wherein if one tooth in the first set of cutting teeth breaks, an exposed surface area of a lead tooth in the second set of cutting teeth immediately following the broken tooth in the first set of cutting teeth increases by less than 45%.

13. A circular saw blade comprising:
a generally circular blade body having a first side face and an opposite second side face;
a plurality of tooth holders coupled to a periphery of the blade body;
a plurality of gullets, each gullet disposed between two adjacent cutting tooth holders;
a plurality of teeth, each tooth supported by one of the tooth holders and having a rake face facing toward an adjacent gullet and extending transverse to the first and second side faces, a relief face extending from the rake face toward the tooth holder that is supporting the cutting tooth and extending transverse to the first and second side faces, and a cutting edge at a junction between the rake face and a relief face and extending transverse to the first and second side faces,
wherein the plurality of teeth sequentially alternate between a first set of cutting teeth and a second set of cutting teeth around the periphery of the blade body,
wherein the first set of cutting teeth have relief faces beveled toward one of the first side face and the second side face in an alternating top bevel pattern at a first top bevel angle, the rake face disposed at a first rake angle relative to a radius of the blade body, and the relief face disposed at a first relief angle relative a line tangent to the periphery of the blade body,
wherein the second set of cutting teeth comprise one or more raker teeth, each raker tooth having a relief face that is symmetrical relative to the first side face and the second side face,
wherein at least two out of the following three conditions are satisfied: (a) the second bevel angle is less than the first bevel angle; (b) the second rake angle is less than the first rake angle, and (c) the second relief angle is less than the first relief angle, and
wherein the first set of cutting teeth and the second set of cutting teeth are configured so that the second set of cutting teeth receive a greater percentage of a total chip load on the plurality of teeth than the first set of cutting teeth.

14. The circular saw blade of claim 13, wherein only two of the three conditions are satisfied, and one of the following additional conditions is also satisfied: (a) each second bevel angle is approximately equal to the first bevel angle; (b) each second rake angle is approximately equal to each first rake angle; and (c) each second relief angle is approximately equal to each first relief angle.

15. The circular saw blade of claim 13, wherein all of the three conditions are satisfied.

16. The circular saw blade of claim 13, wherein each second bevel angle is less than each first bevel angle, each second rake angle is less than each first rake angle, and each second relief angle is approximately equal to each first relief angle.

17. The circular saw blade of claim 13, wherein each second bevel angle is approximately equal to each first bevel angle, each second rake angle is less than each first rake angle, and each second relief angle is less than each first relief angle.

18. The circular saw blade of claim 13, wherein each second bevel angle is less than each first bevel angle, each second rake angle is approximately equal to each first rake angle, and each second relief angle is less than each first relief angle.

19. The circular saw blade of claim 13, wherein the relief face of the raker tooth is at least partially unbeveled.

20. The circular saw blade of claim 13, wherein the relief face of the raker tooth is beveled symmetrically toward the first side face and toward the second side face.

* * * * *